(12) United States Patent
Erol et al.

(10) Patent No.: US 7,606,444 B1
(45) Date of Patent: Oct. 20, 2009

(54) MULTIMODAL ACCESS OF MEETING RECORDINGS

(75) Inventors: Berna Erol, Cupertino, CA (US); Jamey Graham, San Jose, CA (US); Jonathan J. Hull, San Carlos, CA (US); Dar-Shyang Lee, Union City, CA (US)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 11/942,706

(22) Filed: Nov. 19, 2007

Related U.S. Application Data

(62) Division of application No. 10/307,235, filed on Nov. 29, 2002, now Pat. No. 7,298,930.

(51) Int. Cl.
*G06K 9/54* (2006.01)
*G06K 9/60* (2006.01)

(52) U.S. Cl. ............ 382/305; 715/716; 715/719; 715/727

(58) Field of Classification Search ............ 382/305
See application file for complete search history.

(56) References Cited

U.S. PATENT DOCUMENTS

| | | | |
|---|---|---|---|
| 5,132,842 A | * | 7/1992 | Yeh ............... 359/561 |
| 5,664,227 A | * | 9/1997 | Mauldin et al. ....... 715/203 |
| 5,754,938 A | * | 5/1998 | Herz et al. ........... 725/116 |
| 7,298,930 B1 | * | 11/2007 | Erol et al. ........... 382/305 |
| 2003/0018475 A1 | * | 1/2003 | Basu et al. ........... 704/270 |
| 2009/0027618 A1 | * | 1/2009 | Perner ................ 351/206 |

OTHER PUBLICATIONS

Witbrock, M., Hauptmann, A., "Speech Recognition for a Digital Video Library", Journal of the American Society for Information Science (JASIS), 49(7), 1998.*

* cited by examiner

*Primary Examiner*—Matthew C. Bella
*Assistant Examiner*—Sath V. Perungavoor
(74) *Attorney, Agent, or Firm*—Townsend and Townsend and Crew LLP

(57) ABSTRACT

A meeting recorder captures multimodal information of a meeting. Subsequent analysis of the information produces scores indicative of visually and aurally significant events that can help identify significant segments of the meeting recording. Textual analysis can enhance searching for significant meeting segments and otherwise enhance the presentation of the meeting segments.

4 Claims, 14 Drawing Sheets

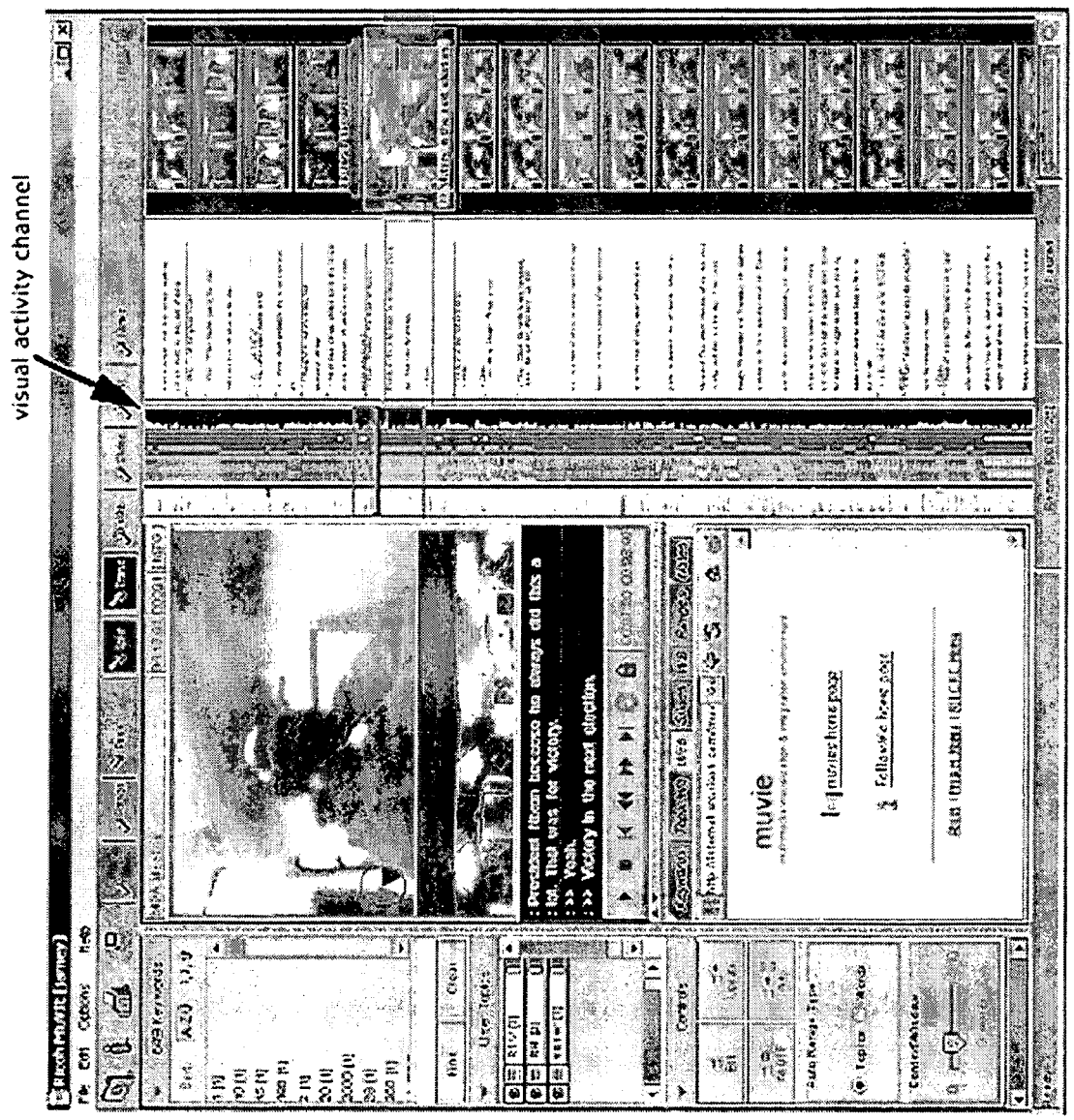
Figure 14 - visual activity channel

MULTIMODAL ACCESS OF MEETING RECORDINGS

CROSS-REFERENCES TO RELATED APPLICATIONS

This application is a divisional application of application Ser. No. 10/307,235, filed Nov. 29, 2002 now U.S. Pat. No. 7,298,930, which is hereby incorporated by reference for all purposes.

This application is related to the following commonly owned and co-pending U.S. Patent Applications which are hereby incorporated by reference for all purposes:

U.S. Pat. No. 7,299,405, issued Nov. 20, 2007; and

U.S. patent application Ser. No. 10/081,129 titled "Multimedia Visualization & Integration Environment," filed Feb. 21, 2002; and U.S. patent application Ser. No. 10/174,522 titled "Television-based Visualization and Navigation Interface," filed Jun. 17, 2002.

BACKGROUND OF THE INVENTION

The present invention relates generally to multimedia meeting recordings and more specifically to access of multimedia meeting recordings.

Progress in the business world typically finds its beginnings with a series of meetings. Meetings are usually drawn out unstructured affairs, consisting of mostly irrelevant information. However, there usually are one or two defining moments that occur during a meeting which can propel the enterprise in the forward direction toward success, or if missed, can result in yet another failed business venture.

Many businesspersons visit remote locations and participate in meetings with different people on a regular basis. A common task that must be performed at some time after the meeting is the creation of a summary of what happened during the meeting. The summary may include reports of who said what, the ideas that were conceived, the events that occurred, and the conclusions that were reached. Oftentimes, it is not just the specific conclusions but also the reasons they were reached and the points of view expressed by the meeting participants that are important.

Producing an accurate meeting summary is a time-consuming and error-prone process, especially if the only record available is one's own memory, perhaps supplemented with hastily handwritten notes. A commonly used portable memory aid is the audiocassette recorder. It can be effective, but lacks the ability to capture important events that could be helpful later, such as gestures, images of participants, body language, drawings, and so on. An easy-to-use method for incorporating video data would help solve this problem.

Meeting recordings can help. Capturing the content of meetings is useful in many respects. Recordings of a meeting can capture the meeting activity and then later be reviewed as needed to refresh one's memory. Knowing that a meeting is being recorded allows the participants to more effectively concentrate on the meeting discussion since the details can be later reviewed in an offline manner. Audio-visual recordings of meetings provide the capability for reviewing and sharing meetings, clarifying miscommunications, and thus increase efficiency.

Recognizing this need, several meeting recorder systems have been developed in recent years. A multimodal approach to creating meeting records based on speech recognition, face detection and people tracking has been reported in CMU's Meeting Room System described by Foote, J. and Kimber, D., *FlyCam: Practical Panoramic Video and Automatic Camera Control*, Proceedings of International Conference on Multimedia & Expo, vol. 3, pp. 1419-1422, 2000. Gross, R., Bett, M. Yu, H., Zhu, X., Pan, Y., Yang, J., Waibel, A., *Towards a Multimodal Meeting Record*, Proceedings of International Conference on Multimedia and Expo, pp. 1593-1596, New York, 2000 also describe a meeting recorder system.

However, people generally prefer not want to watch a recorded meeting from beginning to end. Like the meeting from which the recording was produced, recorded meetings are not amenable to a hit-or-miss search strategy. After fast-forwarding a few times in a meeting video while looking for something, most people will give up unless what they are seeking is important enough to suffer the tedium.

More often than not, people are only interested in an overview of the meeting or just the interesting parts. Enabling efficient access to captured meeting recordings is essential in order to benefit from this content. Searching and browsing audiovisual information can be a time consuming task. Two common approaches for overcoming this problem include key-frame based representations and summarization using video skims. Key-frame based representations have proven to be very useful for video browsing as they give a quick overview to the multimedia content. A key-frame based technique is described by S. Uchihashi, J. Foote, A. Girgensohn, and J. Boreczky, *Video Manga: Generating Semantically Meaningful Video Summaries*, ACM Multimedia, (Orlando, Fla.) ACM Press, pp. 383-392, 1999.

On the other hand, video skims are content-rich summaries that contain both audio and video. Efficiently constructed video skims can be used like movie trailers to communicate the essential content of a video sequence. For example, A. Waibel, M. Bett, et al., *Advances in Automatic Meeting Record Creation and Access*, Proceedings of ICASSP, 2001 propose summarization of meeting content using video skims with a user-determined length. The skims are generated based on relevance ranking and topic segmentation using speech transcripts.

A summarization technique for educational videos based on shot boundary detection, followed by word frequency analysis of speech transcripts, is suggested by C. Taskiran, A. Amir, D. Ponceleon, and E. J. Delp, *Automated Video Summarization Using Speech Transcripts*, SPIE Conf. on St. and Ret. for Media Databases, pp. 371-382, 2002.

A method for summarizing audio-video presentations using slide transitions and/or pitch activity is presented by He, L., Sanocki, E., Gupta, A., and Grudin, J., *Auto-summarization of audio-video presentations*, In Proc. ACM Multimedia, 1999. The authors suggest a method of producing presentation summaries using video channel, audio channel, speaker's time spent on a slide, and end user's actions. The authors discuss the use of pitch information from the audio channel, but their studies showed the technique as being not very useful for summary purposes. Instead, they indicate that the timing of slide transitions can be used to produce the most useful summaries.

Motion content in video can be used for efficiently searching and browsing particular events in a video sequence. This is described, for example, by Pingali, G. S., Opalach, A., Carlbom, I., *Multimedia Retrieval Through Spatio-temporal Activity Maps*, ACM Multimedia, pp. 129-136, 2001 and by Divakaran, A., Vetro, A., Asai, K., Nishikawa, H., *Video Browsing System Based on Compressed Domain Feature Extraction*, IEEE Transactions on Consumer Electronics, vol. 46, pp. 637-644, 2000. As a part of the Informedia™ project, Christel, M., Smith, M., Taylor, C. R., and Winkler, D. *Evolving Video Skims into Useful Multimedia Abstractions*, Proc. of the ACM CHI, pp. 171-178, 1998 compared video skimming techniques using (1) audio analysis based on audio amplitude and term frequency-inverse document frequency (TF-IDF) analysis, (2) audio analysis combined with image analysis based on face/text detection and camera motion, and (3) uniform sampling of video sequences. They reported that audio analysis combined with visual analysis yield significantly better results than skims obtained purely by audio analysis and uniform sampling.

In Sun, X., Foote, J., Kimber, D., and Manjunath, *Panoramic Video Capturing and Compressed Domain Virtual Camera Control*, ACM Multimedia, pp. 229-238, 2001, a user-oriented view is provided based on speaker motion. A perhaps more intuitive solution is to compute the speaker direction as suggested by Rui, Y., Gupta, A., and Cadiz, J., *Viewing Meetings Captured by an Omni-directional Camera*, ACM CHI 2001, pp. 450-457, Seattle, March 31-Apr. 4, 2001. Techniques such as summarization and dialog analysis aimed at providing a higher level of understanding of the meetings to facilitate searching and retrieval have been explored by Hauptmann, A. G., and Smith, M., *Text Speech and Vision for Video Segmentation: The Informedia Project*, Proceedings of the AAAI Fall Symposium on Computational Models for Integrating Language and Vision, 1995.

Analysis of the audio signal is useful in finding segments of recordings containing speaker transitions, emotional arguments, and topic changes, etc. For example, in S. Dagtas, M. Abdel-Mottaleb, *Extraction of TV Highlights using Multimedia Features*, Proc. of MMSP, pp. 91-96, 2001, the important segments of a sports video were determined based on audio magnitude.

In a paper by Bagga, J. Hu, J. Zhong and G. Ramesh, *Multi-source Combined-Media Video Tracking for Summarization*, The 18th International Conference in Pattern Recognition (ICPR'02) Quebec City, Canada, August 2002, the authors discuss the use of text analysis (from closed captioning data) and video analysis to summarize video sequences. Text analysis is performed to find topics by using a similarity measure based on Salton's Vector Space Model. Visual analysis is based on dominant color analysis. Feature vectors found by text and visual analysis are normalized, combined into one feature vector, and hierarchical clustering is used for final clustering. Clustering is performed across multiple videos to find the common news stories. These stories are then used in the summary. Their technique identifies similarities across different video tracks.

Speech content and natural language analysis techniques are commonly used for meeting summarization. However, language analysis-based abstraction techniques may not be sufficient to capture significant visual and audio events in a meeting, such as a person entering the room to join the meeting or an emotional charged discussion. Therefore, it can be appreciated that continued improvement in the area of processing meeting recordings is needed to further facilitate effective access and retrieval of meeting recording information.

SUMMARY OF THE INVENTION

A method for creating video skims is based on audio and visual activity analysis together with text analysis. In an illustrative embodiment of the invention, detection of important visual events in a meeting recording can be achieved by analyzing the localized luminance variations in consideration with the omni-directional property of the video captured by our meeting recording system. In another illustrative embodiment, audio activity analysis is performed by analyzing sound directions—indicating different speakers—and audio amplitude. A further aspect of the present invention is incorporation of text analysis based on the Term Frequency-Inverse Document Frequency measure. The resulting video skims can capture important segments more effectively as compared to the skims obtained by uniform sampling. It can be appreciated that the techniques according to the present invention can be applied to any multimedia recording, wherein meeting recordings constitute only a subset of the broader category of multimedia recordings.

BRIEF DESCRIPTION OF THE DRAWINGS

An understanding of the present invention is provided by the following figures along with the discussion that follows, where:

FIG. 14 shows a version of the GUI of FIG. 10, highlighting the visual activity channel;

DESCRIPTION OF THE SPECIFIC EMBODIMENTS

From the following it will be appreciated that the present invention has broad application generally to multimedia information. However, to facilitate a discussion of the invention sufficient to enable its practice, the present invention will be described in the context of a meeting recording system. As will become apparent, a meeting recording system can prove to be a rich source of various modes of information and thus serves as an appropriate example for describing the numerous aspects of the present invention. However, it is nonetheless noted that many aspects of the present invention are generally applicable to the broader category of "multimedia content."

Figure 1:
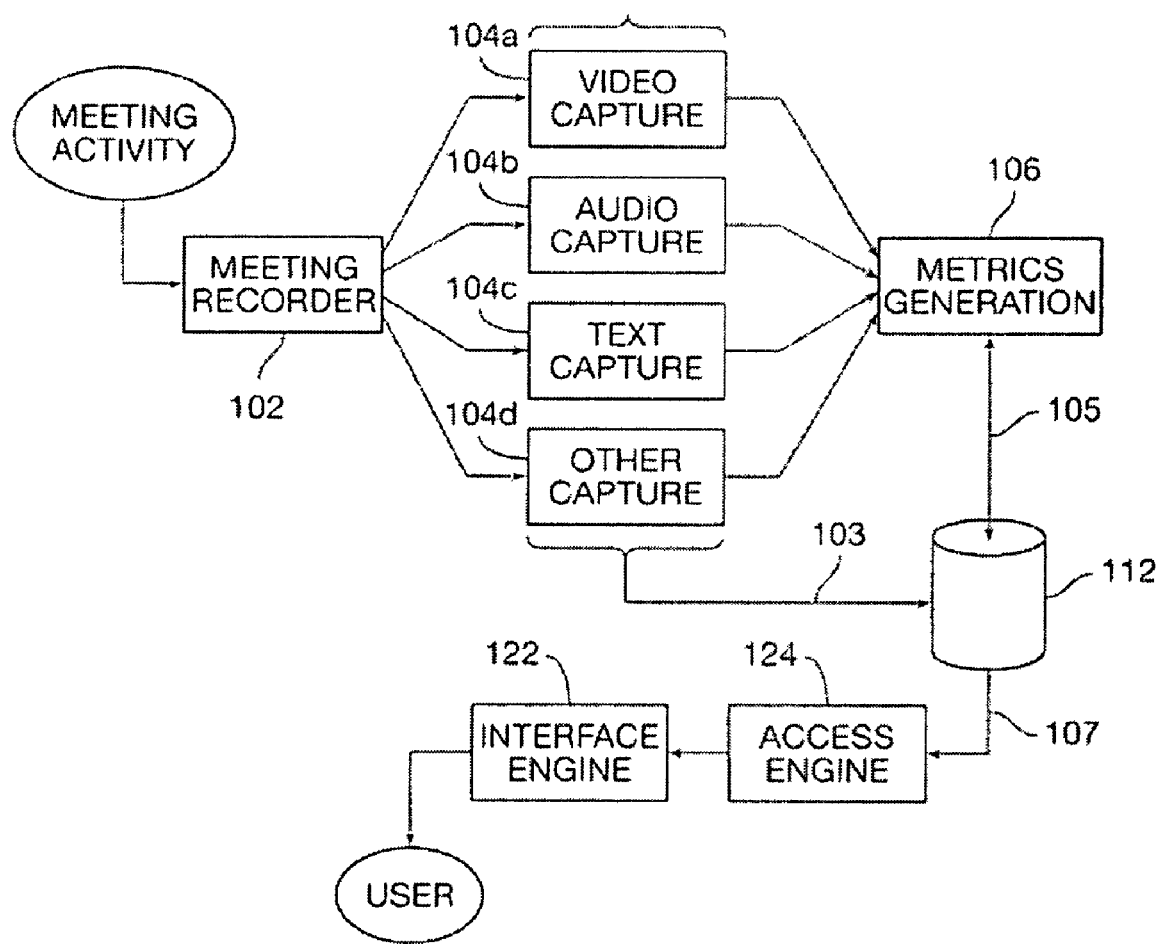
FIG. 1 shows a high level generalized block diagram of a meeting recording and access system in accordance with an illustrative embodiment of the present invention.

The meeting recording and access system exemplar shown in FIG. 1 comprise a meeting recorder component 102 for capturing a variety of media information that can be produced during the activity of a meeting. For example, the meeting recorder can comprise a video recording system 104a to produce a visual recording of the meeting participants and possibly any other visual activity that may be present such as a video presentation made during the meeting. In one embodiment of the invention, for example, the video recording system can be an omni-directional camera having a parabolic mirror for capturing a panoramic view of the meeting room. Such cameras are known. The video stream comprises doughnut-like images.

The meeting recorder 102 may further comprise an audio recording system 104b to produce an audio recording of the conversations of the meeting participants, including other sound sources such as a video presentation, output from a speaker phone, etc., and in general can include any sound that might occur during the meeting (e.g., slamming of a door, sound of a fire engine or an airplane passing by, etc.). Typically, the audio recording system includes a plurality of microphones to pick up the different speakers, and as will be explained, to allow for locating sound sources.

In a particular embodiment of the invention, the audio recording system can also provide sound localization information. For example, sound data can be collected with microphone arrays. Subsequent processing of the data by known sound localization techniques, either in real-time or off-line, can be employed to find the direction of the sound. In a particular embodiment of the invention, sound localization is performed in real-time to avoid the need of handling and saving multiple channels of audio data. This approach may be suitable in a compact configuration such as in a portable system, for example.

The audio signal is processed in segments of 25 msec. Since we are interested only in human speech, segments that do not contain speech in at least one of the sound channels can be ignored. Following speech detection, 360-degree sound localization can be determined in the following manner. For each pair of microphones that are diagonally situated, an angle between 0 and 180 degrees is calculated based on phase difference. This angle defines a cone of confusion centered at the midpoint of the diagonal. In theory, the intersection of two cones computed from both diagonal pairs defines the azimuth and elevation of the sound source. Unfortunately, the angle computed by each pair is not perfect. Moreover, phase difference measured on a finite sampling rate over a small baseline is discrete, and the angular resolution over all directions is non-uniform. Higher resolution is obtained near the center, and is lower towards both ends. Therefore, we need to compute the intersection of two cones of unequal thickness, if they intersect at all. Furthermore, we want to take into consideration the confidence associated with each angle estimate.

To resolve these issues, we use an accumulator over the parameter space of azimuth by elevation. Azimuth varies from 0 to 360 degrees and elevation varies from 0 to 90 degrees. For each possible (azimuth, elevation) pair covered by each cone, its entry is incremented by the confidence associated with the cone. The highest scoring entry in the accumulator corresponds to the best parameter estimate. All entries in the accumulator are decayed by a factor at the end of each segment. However, in trying to estimate both azimuth and elevation, we found the solution unstable and sensitive to the quantization chosen. Furthermore, it does not account for the fact that sound sources close to the middle are detected more accurately than those close to either end. Therefore, the scores at all elevations are summed up for each azimuth, and the best azimuth is returned if its score exceeds a threshold. Then, for each segment where speech is found, a triplet of time-stamp, angle, and score, denoted by $(t, \theta_i, w_i)$, is written to a file. We observed this process is capable of performing in real-time, consuming approximately 25% to 40% CPU load on a 933 MHz PC.

Text capture devices 104c can be incorporated into the meeting recorder 102. For example, a scanner can be provided to allow scanning of documents that are handed out during the meeting. Notes generated during the meeting can be scanned in The text capture can include associating some form of information identifying the originator of the text being captured.

As a catch-all, it can be appreciated that other capture devices 104d can be incorporated into the meeting recorder 102. For example, slides from a slide presentation can be captured. Where a whiteboard is used, one can appreciate that the contents of the whiteboard can be captured using appropriate known whiteboard capture techniques. Meeting participants can use graphics tablets or similar input devices to record handwritten notes. Such devices can facilitate the capture of notes by obviating the step of scanning in notes written on conventional media such as paper.

FIG. 1 shows the meeting recorder 102 and the various data capture components 104a-104d as separate blocks. However it can be appreciated from a system architecture point of view that the distribution of the implementational block comprising these modules can vary greatly. The implementation details of a specific embodiment of the invention is likely to depend on system costs, performance criteria, and other considerations not relevant to the practice of the present invention. For example, the meeting recorder can comprise an omni-directional camera that produces a conventional analog video signal. The video signal can be provided to a separate video processor to produce a suitable digital format for storage and processing by a computer system. A common digital format can be used, such as the MPEG (motion picture experts group) format. However, it is understood that other formats such as MPEG-1, MPEG-2, MPEG-4, H.263, H.263L, JVT/H.26L, and other block-based video compression formats can be used. Similarly, the meeting recorder 102 may simply incorporate one or more microphones for capturing the audio produced in the meeting, outputting an analog audio signal. The audio signal can then be provided to an audio processor to be converted to a suitable digital signal The audio processor may or may not be part of the meeting recorder. Additional processing can be performed to generate sound localization information, which can occur off-line using a separate computer system. In a given implementation, the audio processor and the video processor can be the same processor.

FIG. 1 shows that the information captured by the capture components 104a-104d, collectively represented by the data line 103, can be stored in some sort of data store represented functionally as a storage component 112 for subsequent processing and retrieval. It is noted that this component is only a logical representation of the actual storage hardware; as are the other components shown in the figure. Different storage devices may be used to store different data, including captured data and processed data.

A metrics generator functionality 106 produces a variety of metrics from the various information collected in accordance with the invention (additional details about the computations provided below) and then can be stored in the storage component 112. In one embodiment of the invention, the information can feed directly to the metrics generator from the various data capture device 104a-104d. In another embodiment, the source data for the metric generator can be obtained from the storage component 112 in an off-line manner.

An access engine functionality 124 provides access to the information contained in the storage component. As will be explained below, the captured information can be selected in accordance with the invention based on various combinations of the computed metrics. An interface engine functionality 122 provides an appropriate user interface to the access engine functionality. For example, a graphical user interface (GUI) may be appropriate to facilitate browsing the recorded meeting information. It is noted here that a "user" need not be a conventional human user. Another machine can serve as the "user" of the present invention. In such a case, the interface engine functionality can be defined by an appropriate data exchange protocol. The interface engine functionality can simply be a suitable application programming interface (API), defining a library of utilities to facilitate implementing a suitable GUI, or a machine interface, or even a simple command line interface (CLI).

The discussion will now turn to various metrics that can be produced by the metrics generator functionality 106 according to the present invention. Consider first the video information collected by the video capture functionality 104a. In accordance with an embodiment of the present invention, the video is captured with an omni-directional camera and converted to the MPEG-2 data format for storage and subsequent access.

In a video of a typical meeting sequence, most of the time there is minimal motion. High motion segments of video usually correspond to significant events. For example, a participant getting up to make a presentation, someone joining or leaving the meeting, or just making gestures, could be important for searching and recalling some segments of the meeting.

In accordance with the invention, a visual significance measure is generated based on local luminance changes in a video sequence. A large luminance difference between two consecutive frames is generally an indication of a significant content change, such as a person getting up and moving around. However, insignificant events, such as dimming the lights or all the participants moving slightly, may also result in a large luminance difference between two frames. In order to reduce the likelihood of identifying such events as being significant, the visual significance measure, according to an embodiment of the invention, can be determined by considering luminance changes occurring in small windows of a video frame rather than a single luminance change of the whole frame.

The luminance changes can be computed by computing the luminance difference between the consecutive intra coded (I) frames in the MPEG-2 compressed domain. We employ I-frames because the luminance values in I-frames are coded without prediction from the other frames, and they are therefore independently decodable. We compute luminance differences on the average values of 8×8 pixel blocks obtained from the DC coefficients. The DC coefficients are extracted from the MPEG bit stream without full decompression. Average values of the 8×8 pixel blocks are found by compensating for the DC prediction and scaling. In a particular implementation, the DC coefficients are obtained from the bit stream using a modified version of the publicly available TMN MPEG-2 decoder available at the FTP site:

ftp://mm-tp.cs.berkeley.edu/pub/multimedia/mpeg2/software/).

Figure 2A:
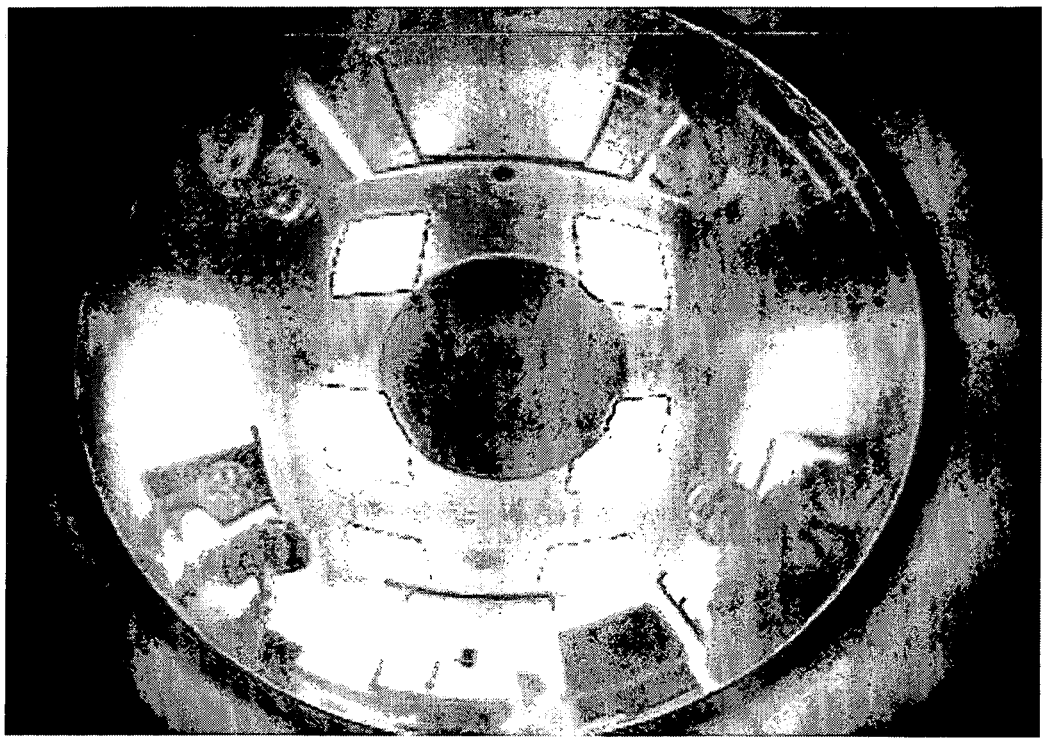
FIG. 2A represents an original frame of video as captured by a video recording device.
Figure 2B:
FIG. 2B represents a video frame reconstructed from only the DC coefficients obtained from an MPEG encoding of the video frame shown in FIG. 2A.

We modified the decoder to only parse the Intra coded frames and to skip some of the decoding operations (e.g., Inverse DCT, Inverse quantization, motion compensation). Because full decoding and reconstruction is not performed, a one hour video can be processed in less than 4 minutes on a 1700 MHz computer. The effects of the operation can be observed with reference to the frames shown in FIGS. 2A and 2B. FIG. 2A shows an original frame of MPEG-2 video. FIG. 2B illustrates a reconstruction of the frame using only the DC coefficients.

Figure 3:
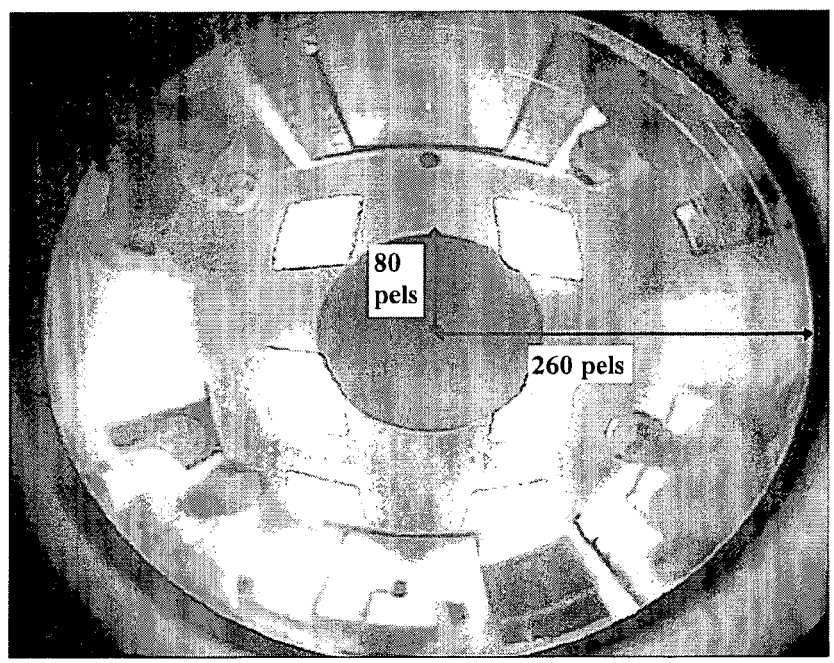
FIG. 3 shows an enlarged view of the doughnut-shaped video images captured using an omni-directional video recorder.

Since the video is recorded using an omni-directional camera, the image is doughnut-shaped. As can be seen in FIG. 3, for example, the pixels (or the DC coefficients) in the outer parts of the doughnut video contain less object information (i.e. more pixels per object), therefore their weight is less than the pixels (or the DC coefficients) that are towards the inner parts. Thus, when computing the frame differences, the pixel values (or the DC coefficients) are weighted according to their location to compensate for this. It can be appreciated of course that for a rectangular-shaped video frame, the weight values $\omega(r)$ are unity.

The weights of the pixels are assigned to compensate for this ratio when computing the frame pixel differences. The assignment of weights is accomplished by considering the parabolic properties of the mirror as follows:

$$\omega(r) = 1 \Big/ \cos^{-1}\left[\frac{1 - 4(r/R_{max})^2}{1 + 4(r/R_{max})^2}\right], \qquad \text{Eqn. 1}$$

where r is the radius of the DC coefficient location in frame centered polar coordinates and $R_{max}$ is the maximum radius of the donut image. The coefficients that do not contain any information (the location that corresponds to outside of the mirror area) are weighed zero.

We employ a window size of 9×9 DC coefficients, which corresponds to a 72×72 pixel area, though it can be appreciated that other suitable window sizes corresponding to different pixel areas can be used. The weighted luminance difference is computed for every possible location of this window in a video frame. A local visual activity measure (score), $V_a$, can be defined as the maximum of these differences as follows:

$$V_a = \max\left\{\sum_{n=-L/2}^{L/2} \sum_{m=-L/2}^{L/2} \left(\omega\left(\sqrt{(x+n)^2 + (y+m)^2}\right) A_{x+n, y+m}\right)\right\}, \qquad \text{Eqn. 2}$$

$$\forall x = [-W/2 + L/2 \ldots W/2 - L/2],$$

$$\forall y = [-H/2 + L/2 \ldots H/2 - L/2],$$

where
- W and H are the width and height of the video frame (in number of DC blocks);
- L is the size of the small local activity frame (in number of DC blocks);
- $\omega(r)$ is the weight of the DC block at location r (in polar coordinates); and
- $A_{ij}$ is the luminance difference between two blocks at location (i×8, j×8) in two consecutive I frames.

It is noted that Eqn. 2 is equally applicable to non-MPEG encoded video. For example, for unencoded video, it can be appreciated that the foregoing operations can be performed on pixels rather than DC blocks. More generally, depending on the specific encoding, a "unit pixel block" can be defined as being the smallest image unit on which Eqn. 2 operates. Thus, in the case of MPEG video, the "unit pixel block" is a DC block of 8×8 pixels. For unencoded video, however, the "unit pixel block" can be a single pixel. A unit pixel block can be square (e.g., 2×2 pixel block, or more generally an N×N block), it can be rectangular (e.g., M×N, M≠N), or some other shape.

Figure 4:
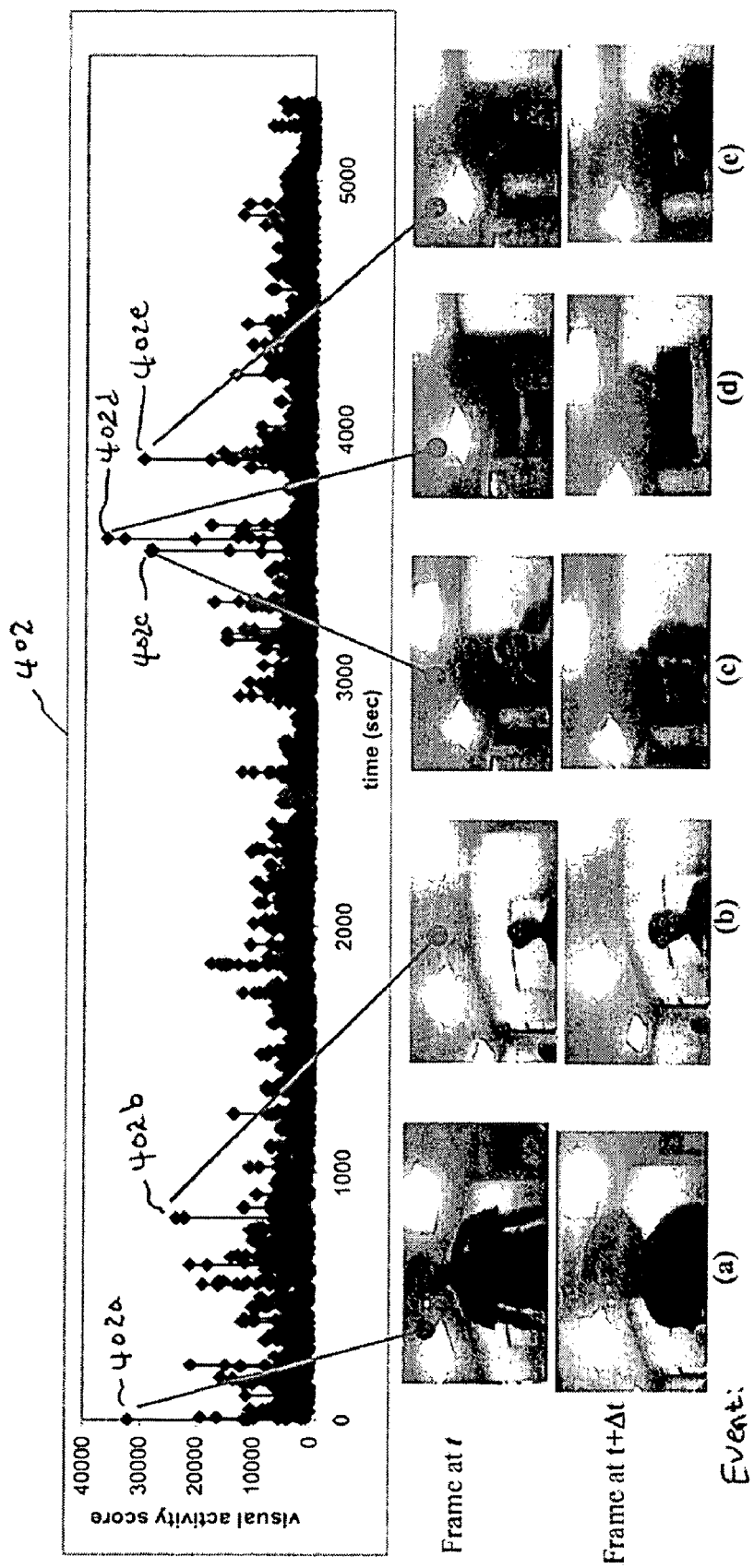
FIG. 4 illustrates an example of video significance metrics according to the present invention.

FIG. 4 shows a plot 402 of computed local visual activity scores versus time for a meeting video. As shown in the figure, many of the peaks of the visual activity score correspond to significant visual events. For example, at event (a), the video frames taken at time t and (t+Δt) show a person taking his place at the table, which can be deemed to be visually significant event. The corresponding computed visual activity score plotted at point 402a exhibits a large value, illustrating the correlation between the computed metric and the visual event. Similarly, the video frames showing a person leaving the meeting room at event (c) also corresponds to a large value at point 402c, again indicative of a visually significant event. Events (d) and (e), showing a person entering the room also yield a large computed score, at points 402d and 402e, respectively. In a particular embodiment of this aspect of the invention, the video is encoded using MPEG encoding, so the video frame at (t+Δt) is the next I-frame in the MPEG stream.

On the other hand, the video frames shown for event (b) are deemed not to have visual significance, since the activity is simply the person moving closer to the camera. Nonetheless, this segment has a large corresponding activity value 402b because the motion toward the camera appears as a large moving object due to the change in perspective. Exclusion of such segments from the category of important visual events can be achieved if we compensate for the distance of the objects from the camera by utilizing techniques such as stereovision. Despite this anomalous behavior, it can be appreciated that the foregoing local visual activity score can nonetheless serve as the basis for determining a visual significance metric for a frame of video. As will be discussed below, the visual significance metric in turn can serve as a basis for identifying visually significant events in a video recording.

Another aspect of the metric generation functionality 106 shown in FIG. 1 is generation of audio significance scores from the captured audio. Our goal is to find significant segments of audio, which can be comprised of arguments and discussion activity among meeting participants. Though high amplitude audio resulting from a raised voice provides a good indication of the presence of emotion, it was discovered that amplitude by itself is not a sufficient indication of a significant audio event. For example, the sound of a door slamming or the noise from a heavy object falling to the floor do not constitute significant audio events.

In accordance with the present invention, we combine audio amplitude information with sound localization information from our meeting recorder system. It was discovered that sounds coming from different directions in a short time window indicates a discussion among several speakers potentially of a salient topic, and thus warrants attention as a significant audio event.

Thus, in accordance with an aspect of the invention, we define a speaker activity measure, $S_a$, as:

$$S_a(t) = \sum_{n=-W/2}^{n=W/2} G(n)C(t+n), \quad \text{Eqn. 3}$$

where
  t is a time index (e.g., units of seconds) measured with respect to the time frame of the meeting recording, e.g., time index t=0 seconds might be at the beginning of the meeting recording;
  G(n) is the smoothing filter coefficient;
  W is the length of the smoothing filter; and
  C(t) is the number of changes (transitions) in the sound direction at time t.

This metric is a measure of the conversational activity among the participants in the meeting. G(n) can be any suitable smoothing filter. For example, in an embodiment of the invention a Gaussian filter is empoloyed. C(t) is either the number of changes in the sound direction or the number of speaker changes, measured in the time frame of [t−½, t+½]. The time index t can be any time unit; here we use seconds. For example, if the sound direction was constant between [t−½, t+½] seconds, C(t) takes value "0". If there was one sound direction or speaker change, then C(t) takes value "1" and so on.

Audio activity measure, $U_a(t)$, is defined as:

$$U_a(t) = S_a(t) \times \sum_{k=-f/2}^{f/2} |X(ft+k)|, \quad \text{Eqn. 4}$$

where $S_a(t)$ is speaker activity at time index t, f is the audio sampling frequency, and X(n) is the audio amplitude of the $n^{th}$ sample. In accordance with this particular embodiment of the invention, the audio activity measure is the basis for the audio significance score.

Figure 5:
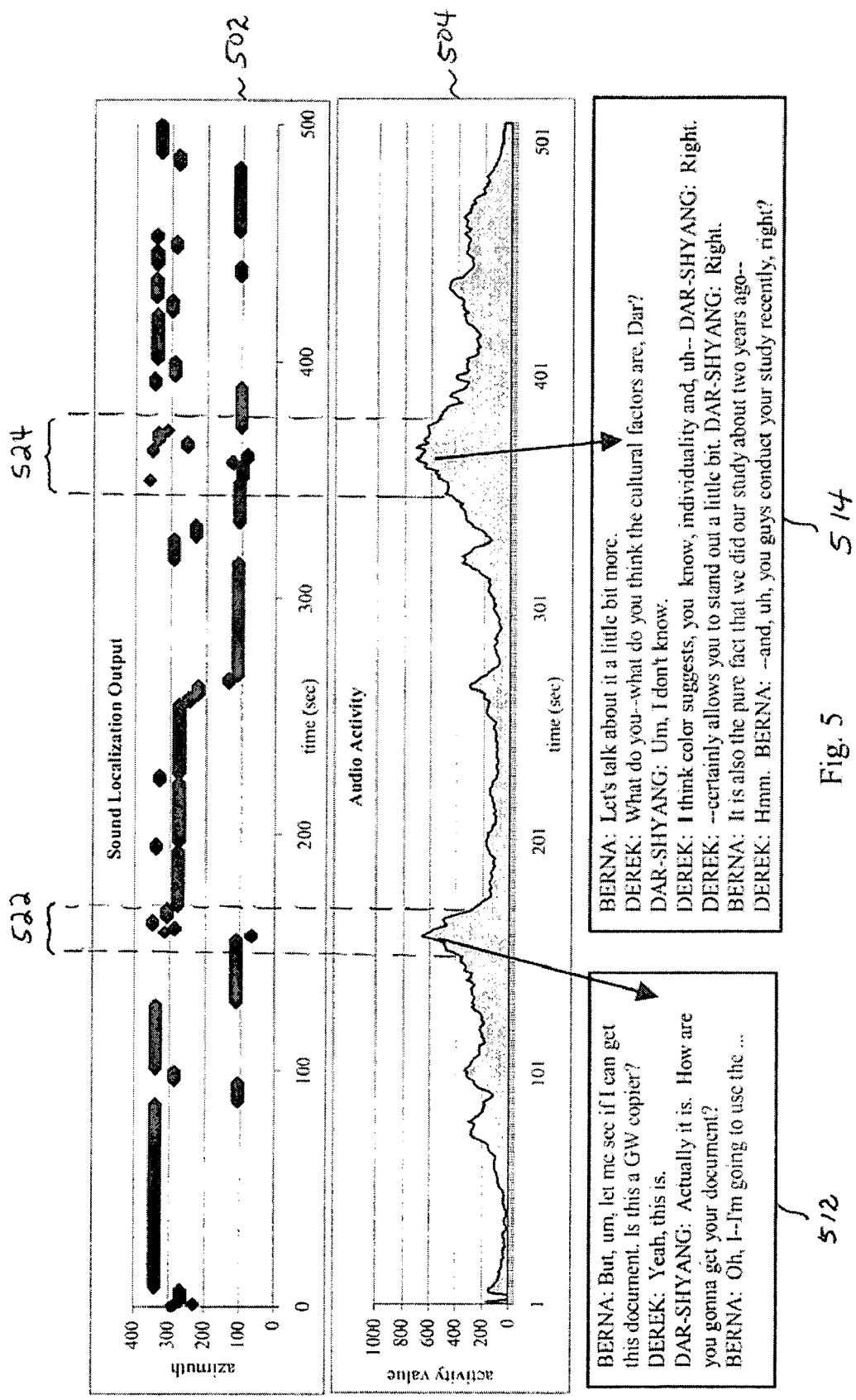
FIG. 5 illustrates an example of audio significance metrics according to the present invention.

FIG. 5 illustrates experimental results of recordings processed in accordance with the invention; in this particular example, audio clips from a staff meeting recording. The figure includes a sound localization plot 502, showing locations of sound originations recorded over time. Here, rather than the absolute values of the sound directions, the changes in sound directions are significant. C(t), which is used to compute $S_a(t)$, is computed based on a count of changes in the sound direction in a [t−½, t+½] window. The sound localization plot graphically illustrates the changes in sound direction which occur during a conversation among many people. Audio activity is represented by an audio activity plot 504 which is a plot of audio activity metrics $U_a(t)$ versus time t. In the example shown, a transcript of each of the audio clips from the meeting discussion is provided in the dialog boxes 512, 514.

The audio activity plot 504, exhibits high regions 522 and 524, which correlate with the speaker activity shown in the dialog boxes. For example, the dialog box 512 indicates an exchange of ideas among four speakers. The speaker activity is illustrated in the region 522 of the sound localization plot 502, indicating a local increase in the rate of change of the sound location. The speaker activity is shown by the peaks in the corresponding region of the audio activity plot. Similarly, the dialog box 514 indicates an even more animated interchange of ideas. This can be seen by inspecting the corresponding period of time on the sound localization plot 502 at region 524. The corresponding region of time on the audio activity plot 504 shows a region of peaks in the audio activity metrics.

It can be appreciated therefore that by analyzing various parameters of these audio plots, significant audio events can be identified. For example, it was discovered from initial experiments with several recordings of staff meetings, presentations, and brain storming sessions, that the peaks in the audio activity plot 504 bear a correspondence to the audio clips with a high degree of meeting participant interactions and few silent periods.

Still another aspect of the metric generation functionality 106 shown in FIG. 1 is generation of textual scores. In accordance with the invention, the audio recording of a meeting can be transcribed to produce a rich source of text. Language analysis techniques are commonly used to summarize documents and audio transcriptions. Here, we compute the well-known Term Frequency-Inverse Document Frequency (TF-IDF) on meeting transcriptions in order to find segments that contain important keywords. TF-IDF is defined as TF-IDF=tf/df, where tf is the frequency of a word in a document and df is the frequency of the same word in a collection of documents. For a transcript of a meeting recording, the collection of documents comprises the collection of transcripts from various meetings.

Figure 7:
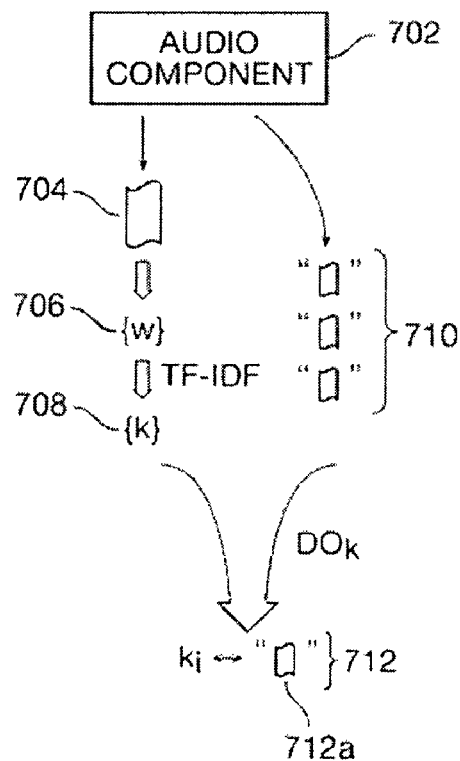
FIG. 7 illustrates transcript processing according to an aspect of the present invention.

This measure is employed in our system as follows, referring to FIG. 7. A transcript 704 is produced from the audio component 702 of the meeting recording. A TF-IDF score is produced for each word in a set of words 706 taken from the transcript. The words having the highest TF-IDF scores define a set of keywords 708. For example, the keywords can be those words 706 having TF-IDF scores which exceed some pre-selected threshold value. It can be appreciated that other techniques can be used to define the set of keyword; however, TF-IDF is recognized as a technique for providing reliable performance in many applications.

In order to find when a given keyword most frequently occurs, we divide the audio transcriptions into audio segments 710 of some duration (e.g., transcriptions of 10-second audio clips) and compute a document occurrence score $DO_k$ as follows:

$$DO_k(i) = \sum_{n=-W/2}^{n=W/2} G(n) O_k(i+n), \qquad \text{Eqn. 5}$$

where
- i is the audio segment number;
- G(n) is the smoothing filter coefficient;
- W is the length of the smoothing filter; and
- $O_k(i)$ is the number of occurrences of the keyword k in the audio segment.

The audio segment with the highest $DO_k$ value is defined as the keyword audio segment 712a for keyword k. These mapped audio segments 712 can be used to enhance accessed segments (e.g., video skims) of the meeting recording. For example, video clips corresponding to the keyword audio segments can be added to the video skim.

Figure 6:
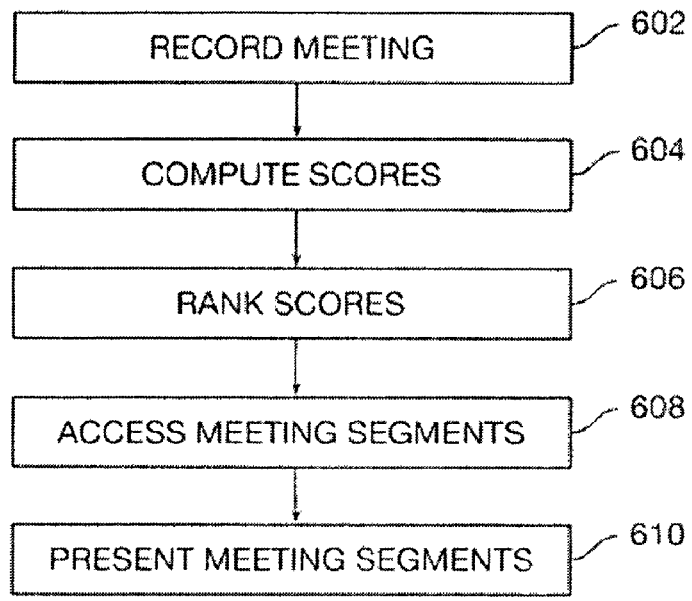
FIG. 6 is a high level diagram generally illustrating the process of identifying significant meeting events.

FIG. 6 is a high level generalized flow diagram, illustrating the basic processing for identifying and accessing summaries of a meeting recording comprising significant segments from the meeting recording in accordance with the invention. Our goal is to find meeting segments that communicate the salient content of a meeting most efficiently. The process begins with a step 602 of obtaining a recording of the meeting. As can be appreciated from the foregoing, a meeting recording can comprise various modalities of recorded information, including video, audio, and textual information. In accordance with a particular implementation of the invention, the recorded meeting information is reduced to digital form for subsequent processing. For example, video information can be encoded in a suitable MPEG format, audio can similarly be digitized, and textual information can be converted by appropriate optical character recognition (OCR) software.

In a step 604, significance scores are computed from the captured recorded meeting information. For example, in an embodiment of the invention, a visual significance score ($V_a$) can be produced for each video frame of the video component of the captured recording meeting based on local luminance metrics computed for that frame, such as discussed above. Similarly, an audio significance score ($U_a$) can be computed in the manner described above, using sound localization information contained in the audio component of the recording meeting. Transcripts can be generated from the audio component and processed so that each of a number of keywords identified in the transcript can be associated with one or more audio clips (keyword audio segments) that are deemed to be significant with respect to that keyword.

Next, in a step 606, the computed scores generated in step 604 can be ranked; e.g., sorted by magnitude. In accordance with an embodiment of the present invention, the visual significance scores ($V_a$) and audio significance scores ($U_a$) are sorted. Similarly, computed keyword audio segments (those with the highest $DO_k$ values) are sorted according to the TF-IDF of the keywords.

Access to the meeting recording can be provided in the form of extracted portions of the meeting recording, in a step 608, based on one or more of these scores. In a particular implementation of the invention, the extracted content can be presented as a video skim (comprising, for example, video and audio) that is played on a suitable display; e.g., an audio-video capable system such as a PC with speakers. A video skim can be produced based on a visual significance score. Alternatively, the video skim can be based solely on an audio significance score. Still another alternative is a video skim based on a combination of two or more of these and other scores, or on a composite score computed as a function of two or more of these and other scores.

Suppose the recorded meeting is accessed as a one minute video skim based solely on a given visual activity score. A video frame having that score is selected from the recorded meeting data and can be the basis from which the video skim is produced. In this case, the video skim might comprise a one minute segment of consecutive video frames (video clip) from the recorded meeting starting with the selected video frame. Alternatively, the video clip might be selected from the recorded meeting such that it ends with the selected video frame. A segment of the recorded meeting can be selected which includes the selected video frame somewhere in the video clip. If appropriate, the video clip might even be a segment of the recorded meeting that precedes (or follows) the selected video frame by some amount of time. It might be desirable to compose the one minute video skim by combining a series of shorter video clips of equal or unequal duration. The video clip can be presented as video-only, absent a corresponding audio track. Such a presentation might be desirable, depending on the purpose of the users. Of course, the video skim can include the corresponding audio track.

Depending on performance, storage capacity, and other such criteria, these video skims can be produced on a demand basis; that is, only when a visual significance score is presented. On the other hand, a video skim for some or all of the visual significance scores can be generated offline and stored for later retrieval, thus allowing faster access albeit possibly at the expense of providing substantial storage capacity.

Content of the recorded meeting can be accessed (e.g., a one minute video skim presentation) based solely on a given audio significance score. Again, suppose a one minute video skim is desired. The time index corresponding to the given audio score is determined. In this case, the video skim can comprise a one minute segment of the video (video clip) taken from the recorded meeting based on that time index, including possibly the audio track. The video clip can begin or end at that time index, or the video clip can span a period of time that includes the time index. The video clip might even be for a period of time that is earlier than the time index or is later than the time index. It may be desirable to compose the one minute video skim by combining a series of shorter length video clips of equal or unequal duration. Also, it is possible to store video skims for some or all of the audio significance scores in an offline manner as discussed above.

It can be appreciated that as an alternative to composing and presenting a video skim, an audio-only segment corresponding to the given audio significance score can be presented; though such a presentation may not be as effective as a presentation that includes the video track. However, in situations where no corresponding visual information is available, an audio-track only presentation would be appropriate.

The recorded meeting can be accessed by presenting a video skim that is generated based on a given visual significance score and a given audio significance score. For example, consider again that a one minute video skim is desired. The video skim can comprise a first segment of video based on the visual activity score as discussed above and a second segment of video based on the audio score as discussed above. The segments can be of equal or unequal duration.

It can be appreciated that where two non-consecutive video clips are played back, it may be desirable to "stitch" together the clips in order to smooth out the transition between clips to minimize the distraction of a sudden scene change. For example, a wipe transition (e.g., right to left) can be applied to the video tracks to transition from one clip to the next. Of course, other transitions can be used. Transitioning of the corresponding audio tracks from one video clip to the next can be achieved by audio fades or the like. If any two clips are close in time or if they overlap, they can be merged into a single clip to achieve continuity.

Continuing with FIG. 6, consider an example where a user might request the most significant video skim of the meeting (step 610) of say five minutes in duration. The video skim can be produced by taking the highest valued visual significance score from the ranked list of scores (step 604) and accessing the corresponding video frame. The video skim can then be produced from that video frame in the manner described above. In the case where two or more scores have the same highest value, a random selection can be made to select from among the two or more corresponding video frames as the basis for generating the video skim. Another selection criterion might be to choose the earliest video frame, or the latest video frame, or the middle-most video frame. A request can be presented to the user to make the selection of video frame. Still another resolution might be to use all the video frames combined in the manner discussed below to produce the video skim.

Further in accordance with the invention, the video skim can be produced from plural video frames. In this approach, the first N highest-valued visual significance scores can be selected from the ranked list of visual activity scores (step 604). A video clip can be produced for each of the selected N video scores in the manner described above. The time duration of each video clip can be equal or unequal. The video clips can then be stitched together using suitable transitioning techniques to produce a video skim of the desired duration; e.g., five minutes. The value of N can be a user-specified quantity. It can be appreciated that the duration of each video clip comprising the video skim are dependent on the duration of the video skim and the value of N. Generally, the following relation should hold true:

$$D \approx \sum_{i=0}^{i=N-1} d_i, \quad \text{Eqn. 6}$$

where
D is the duration of the requested video skim,
N is the number of video clips comprising the video skim, and
$d_i$ is the duration of the $i^{th}$ video clip.

The approximation sign (~) reflects the possibility that the total duration of the final video skim may be longer than (or shorter than) the duration D of the desired video skim, owing largely to the application of transition effects between discontinuous segments. However, due to merging of close-in-time segments, and other such factors, the total time might come in at less than D. It can be seen that the parameters D and N, and each $d_i$ can be user-specified, or automatically determined.

Similarly, the most significant video skim of a recorded can be based on the audio significance scores. The video skim can comprise the video clip produced based on the time index corresponding to the highest valued audio significance score in the manner discussed above. Where two or more scores have the same highest value, a resolution can be achieved in a manner as discussed above in connection with visual significance scores.

Alternatively, the video skim can comprise a plurality of video clips generated based on the audio scores. Thus, the first M highest audio scores can be selected, from which M time indices can be obtained. The video skim can comprise the plurality of video clips produced based on the time indices in the manner discussed above.

In still another variation, the most significant video skim of a recorded meeting can be composed based on visual and audio significance scores. In a simple composition, the video skim comprises a first video clip based on the highest value visual activity score and a second video clip based on the highest value audio score. Alternatively, the video skim can comprise a first plurality of video clips based on the N highest visual activity scores and second plurality of video clips based on the M highest audio scores.

It can be appreciated that video skims can be generated in various ways using the visual and audio scores. It can be further appreciated that the next most significant video skim could comprise video clips based on the next highest visual activity score, or on the next N highest visual activity scores, or on the next highest audio score, or on the next M highest audio scores, or on both the visual and audio scores.

In accordance with another aspect of the present invention, a single metric can be computed by combining the video, audio, and textual scores to produce a composite score. For example, an arithmetic combination can be performed such as multiplication of the scores, addition of the scores, or some combination of multiplication and addition. Generally, it can be appreciated that some analytical treatment can be performed to produce the composite score.

If the composite score is computed for a meeting moment at time t, a meeting segment can be defined as the meeting recording between [t−Δt, t+Δt]. Segments from the recording meeting corresponding to N such scores can then be selected and combined into a video skim of the meeting recording.

The video skims can be enhanced with additional video clips. The following discussion applies to each of the above-described processes for generating video skims. For example, consider when the most significant event is to be accessed from the recorded meeting. A video skim representing this can be produced in accordance with any one of a number of various embodiments of the invention. As another variation, the video skim can further comprise a video clip extracted from the recorded meeting based on the keyword audio segment metric ($DO_k$) having the highest value. The keyword audio segment and its corresponding video track can be included along with the other video clips which comprise the video skim.

From the foregoing, it can be appreciated that additional modes of information can be captured and incorporated into the process for identifying significant events. These additional modes of information can be captured by appropriate devices collectively represented in FIG. 1 as other capture devices 104d. For example, slide presentations can be captured and used to identify significant meeting events. Slide projection systems can be equipped with digitizing devices to capture the image including text. Personal computers can include slide production software which can store the slide contents for subsequent processing. If necessary, optical character recognition (OCR) techniques can be applied to the captured slide images to extract textual content from the slides. TF-IDF analysis can be performed on the text and associated with "events" from the slide presentation. Thus, for example, an event can be the time when the title slide is presented. Other such events can be the time when an outline of the presentation is presented, or when the conclusions are presented.

Events may include capture of audio information from speakers during the slide presentation. For example, when the presenter(s) introduce themselves this could be deemed a significant event. When a discussion ensues among the participants, this might signify a relevant event. Another event might be the slide that includes a discussion of the main topic. A significant event is likely to be the slide that the speaker spent the most time discussing. Likewise, a significant event might be the slide that resulted in the most discussion as determined based on the audio activity metric. In addition, these discussion events might involve speech capture of the discussion participants and subsequent transcription of the captured speech. The above-described analytical technique can be applied to the transcribed speech text to produce document occurrence scores $DO_k$, where each keyword k is associated with the audio clip (keyword audio segment) having the highest $DO_k$ as described above. The slide(s) presented during the time period spanned by that audio clip can be associated with that keyword.

Another mode of information can be information captured from a whiteboard. Again the text can be captured and transcribed by various whiteboard capture devices which are known and commercially available. Discussion-related events can be detected based on the audio activity score. Keywords from the discussions can be processed by capturing the discussion and converting the captured speech to text. In addition to its associated audio clip (keyword audio segment), each keyword k can be further associated with the captured whiteboard information corresponding to the time period spanned by that audio clip. Other events might include noting when a person steps up to the whiteboard to use it. Such an event can be detected based on a video activity metric generated from the captured video recording.

More often than not, the mainstay of a meeting is paper. The agenda of a meeting is likely to be on paper. The topics of discussion are typically disseminated on paper, a copy provided for each participant. Notes jotted down during the meeting are recorded on paper. This represents a large source of useful text that can be subject to analysis, particularly notes produced during the meeting. The text contained in these papers, can be converted to text via OCR processing. Events can be determined based on the note taking activity. For example, the time-spans can be recorded of when meeting participants take notes. An importance score can be assigned to a time-span based on the number of people taking notes, length of the notes, and so on.

Identification of meeting participants can be used as a basis for enhancing detected events. For example, the video of an event determined to be significant by any of the foregoing techniques can be further analyzed to identify the participants in the video. An importance score can be assigned to the current speaker based on the speaker's rank in the company. Those meeting segments containing higher ranked employees may potentially be more important than other segments. The importance score can be based on speaker dominance. If one or several speakers dominate the meeting, the meeting segments containing those speakers are potentially more important than other segments. The importance score can also be based on the number of active speakers. The first or the last time a speaker speaks can be potentially more important than the rest of the meeting, and so the importance score can include that consideration.

Thus, in accordance with another implementation of the invention, the various modalities (video, audio, various forms of text) can be scored and used to identify significant meeting segments. For example, an importance score can be computed for each modality associated with each second of a meeting. The importance scores can then be combined to produce a significance score, for example by multiplying together all of the scores, or by summing all the scores, or by some other combination. The significance scores can then be ranked.

A video skim might comprise a number of 10-second segments of the meeting recording. For example, the $n^{th}$ most significant video skim of a meeting can be defined as a group of M segments, where the segments are based on the $n^{th}$ group of M consecutive significance scores taken from the ranked list. Thus, the meeting segments comprising the most significant video skim can be selected by taking 10-second segments of the meeting recording at those time indices having the M highest corresponding significance scores.

It was noted earlier that an embodiment of a meeting recorder in accordance with the present invention can be a portable device. A portable meeting recorder offers certain advantages, but presents its own unique challenges. Unlike a meeting recorder which might be based on instrumentation of a conference room where most meetings are carried out in one place, meetings recorded with a portable meeting recorder can take place in different locations. Identifying the meeting location can provide a very useful retrieval cue to facilitate identifying significant segments of a recording of a meeting that comprises many meetings taking place in various locations. One possible solution is to incorporate a GPS device into the portable meeting recorder. However, the accuracy of current GPS technology may not be sufficient to accurately identify the meeting locations, especially considering that they take place indoors.

Figure 8A:
FIG. 8A illustrates a dewarped image.

Referring to FIG. 8A, our solution is based on recognizing a meeting room (or more generally a meeting location) from visual clues contained the video data components of a meeting recording. We first perform background/foreground extraction as the recorder is manually operated and therefore it is unreasonable to assume that a clean shot of the background can be obtained with no person in the room. We use adaptive background modeling to extract the background. Our algorithm is based on an extension of a method discussed by Stauffer, C. and Grimson, W. E. L, *Adaptive Background Mixture Models for Real-Time Tracking*, Proceedings of Computer Vision and Pattern Recognition, pp. 246-252, 1999. A Gaussian mixture approximates the distribution of values at every pixel over time. For each Gaussian constituent, its likelihood of being background is estimated based on its variance, frequency of occurrence, color and neighborhood constraints. From this, an image of the background can be constructed based on the most likely background Gaussian at every pixel. Since this background estimate changes over time, for example due to the movement of objects in the room, we extract a new image every time a significant change in the background model is detected. These images are dewarped into a panoramic cylindrical projection as shown in FIG. 8A. The first image in the figure shows the meeting room with some background and foreground objects. The second image shows the foreground. The third image shows the background separated by our algorithm.

To identify the location, the background images can be matched against room templates in the database. Since the number of placements for the recorder in a particular room is usually limited, the templates can be categorically organized and stored as separate templates. In our case, one template is obtained from each end of a table in a conference room. We match the templates with the backgrounds of the meeting recordings by comparing their color histograms. The histograms are formed in the HSV color space because distance values in this space approximate human perception. The color space represented with 256 bins, where Hue is quantized into 16 bins, and Saturation and Value are quantized into 4 bins each.

Several background images are extracted for each meeting and an intersection histogram is computed using the histograms of these images. The intersection histogram is compared using Euclidian distance with each template in the database to find the closest matching meeting room. Employing an intersection histogram allows us to further eliminate the non-stationary objects in the meeting room and smooth out any background extraction errors. The use of multiple templates for each room provides a robust method for location identification. In our experiments, we successfully identified the 5 meeting rooms that we have in our research facility. Improvements to the algorithm might include using the size and the layout of the meeting room to address the issue of distinguishing rooms with similar colors.

Recorded meeting segments can be enhanced by further identifying and locating the meeting participants in the recorded segment. Locating meeting participants is a non-trivial problem, especially considering that a clean shot of the background is typically not available and participants are likely to have minimal motion. We address this problem by using sound localization to find the approximate location of each meeting participant. Then the precise location of each face is found by identifying the skin regions in this approximate location.

Figure 8B:
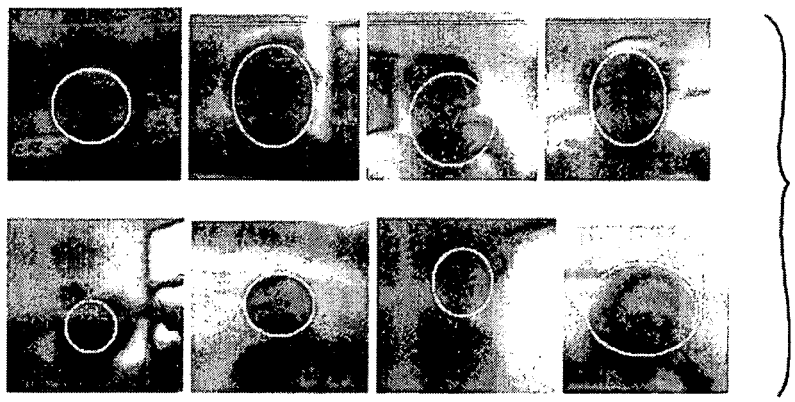
FIG. 8B shows the results of a participant identification process.

Skin pixels are detected in the normalized RG-space as discussed, for example, by Waibel, A., Bett, M., Metze, F., Ries, K., Schaaf, T., Schultz, T., Soltau, H., Yu, H., and Zechner, K., Advances in Automatic Meeting Record Creation and Access, Proceedings of the International Conference on Acoustics, Speech, and Signal Processing, 597-600, 2001. Small holes in skin-colored regions can be removed by a morphological closing and then connected component analysis can be used to identify face region candidates. In environments with complex backgrounds, many objects, such as wood, clothes, and walls, may have colors similar to skin. Therefore, further analysis of the skin-colored regions, using techniques such as luminance variation and geometric feature analysis can be applied to further eliminate non-face regions. Some example face localization results are shown in FIG. 8B.

One of our goals is to find representative shots of the meeting attendees that can be included in the meeting description document. It is possible to extract many shots of a participant from the video sequence. However, generally not all of these shots are presentable. It is desirable to obtain frames where the individual is not occluded and facing the camera.

Figure 9:
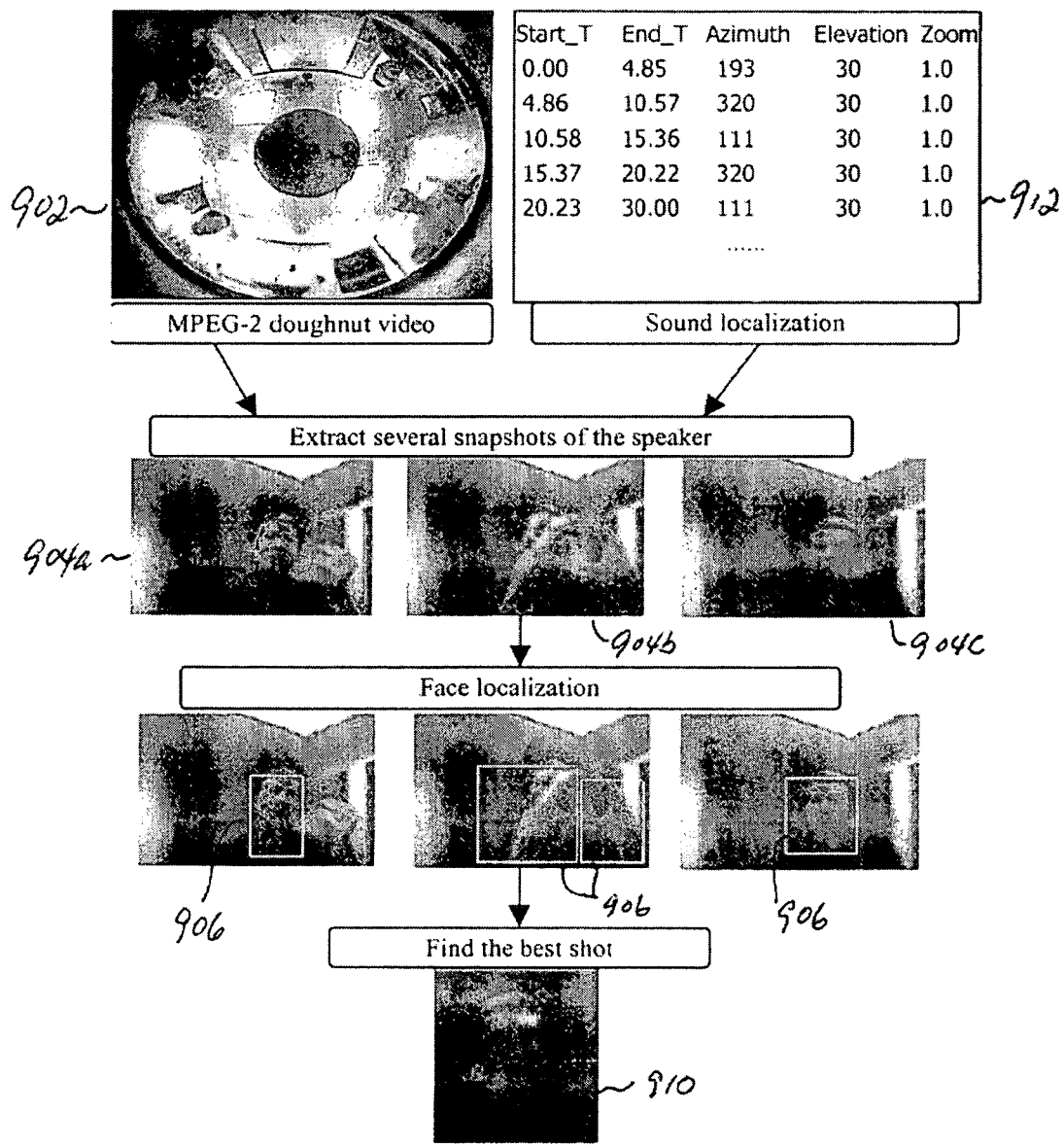
FIG. 9 illustrates best shot processing of an image.

An example of obtaining a "best shot" from a video sequence is shown in FIG. 9. First, the source video (in this case, the doughnut shaped video 902 from an omni-directional camera) is captured. Several still shots of the speaker are then extracted. In one implementation, sound localization information 912 is used to identify candidate still shots; e.g. a still from when she/he first starts speaking 904a, a still from when she/he finishes speaking (for the first time) 904b, and one between these two times 904c.

These shots are then evaluated to pick the best shot of a meeting participant. For example, the best shot 910 can be selected by evaluating the size of the face region relative to the size of the body region and/or the whole frame, evaluating the ratio of the face width and height, and evaluating the ratio of number of skin pixels detected in the best-fitted ellipse (to the face region) to the area of the best-fitted ellipse. FIG. 9 shows various regions 906 that can be considered. The larger faces with more skin pixels are selected as better shots.

In a specific implementation, high resolution video capture devices can be used to produce high resolution images of the participants. This provides sufficient resolution in the captured video for the application of computer image analytical techniques to identify certain facial features, such as eye and mouth regions. The selection of the best attendee shots can be based on the detail of the facial features, such as the mouth and eyes, the distances between these facial features and their relative locations, the size and geometry of the face region, and so on. When the image of the face of a person looking straight at the camera is taken, these parameters tend to fall within certain ranges. These ranges can be the basis for computing templates to facilitate making a determination whether a person is looking straight at the camera.

Figure 9A:
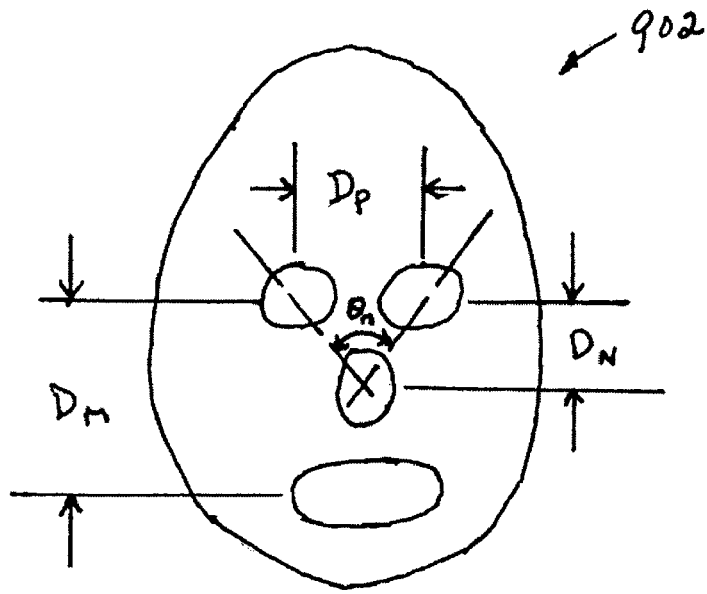
FIGS. 9A and 9B show schematic representations of criteria that can be used for best shot processing.

FIG. 9A shows a schematic representation of a template, highlighting some possible facial metrics that can be used to create a template. For example, the template 902 comprises a pair of eye regions, a nose region, and a mouth region. Some metric exemplars of the template might include an eye separation $D_p$, measured between the center of each eye. A nose angle $\theta_n$ can be measured as the angle between two lines passing through an interior of the nose region to the center of each eye. A mouth separation $D_m$ can be the distance from the eye to the mouth. Similarly, a nose separation $D_n$ can be the distance from the eye to the nose.

In a face image of a meeting participant who is facing away from the camera, the various facial features metrics will deviate from the template metrics. For example, in a face image of a person whose face is turned to one side, the eye separation will be less than if the person had faced the camera squarely due the effect of the image of the eyes being projected onto a two dimensional surface. Thus, a best shot determination from among many "shots" (images) of a meeting participant's face can be made, first by identifying the facial features of interest for a given image. Next, metrics among the facial features are determined, such as shown in FIG. 9A. These determined metrics are then compared against their corresponding template metrics. A error computation can be performed to produce an error quantity for that image. For example, each template metric can have an associated tolerance to establish a tolerance range. Each determined metric can be compared against the corresponding template metric to determine it falls within or outside of the tolerance range. If the determined metric falls outside of the range, the amount of deviation can be recorded. A composite error quantity can be computed based on the number of determined metrics that fall within the tolerance range and the amount of deviation of the determined metrics that fall outside of the tolerance range. The process is repeated, and the image having the smallest error quantity can be deemed to be the best shot of that person.

The locations of the eye pupils can be detected using an IR emitter attached to the meeting recorder as an enhancement to the camera. (For example, J. Davis and S. Vaks in *A Perceptual User Interface for Recognizing Head Gesture Acknowledgements*, ACM Workshop on Perceptual User Interfaces, Orlando, Fla., Nov. 15-16, 2001, describe such a system.) Sound localization can then be combined with the IR-based eye pupil detection to eliminate false positives in pupil detection. Recall that sound localization data includes at each time index information indicating the direction of each sound source. The images each can be associated with a time index. Each image that is analyzed for pupil identification can be cross-referenced with the sound localization data based on the time index associated with the image in order to provide an additional decision point for pupil identification.

For example, suppose an image is being analyzed (using known computer image analysis algorithms) to identify pupils. Suppose further that a positive determination has been made, indicating the presence of pupils. On the one hand, one can simply assume the determination to be correct and continue on. On the other hand, the sound localization data can be used as an additional test to add some confidence to a positive determination. The time index associated with the image is used to access the sound localization data corresponding to that time index. If the sound localization data does not indicate that any sound originated from the direction of the camera at that time index, then such an indication can be interpreted to mean that the positive determination was a false positive, and the quest for eyeballs would continue. On the other hand, if the sound localization data indicated a sound originated from the direction of the camera at that time index, then the positive determination can be deemed to have been confirmed. Generally, employing the additional information of the IR data and the sound localization data can increase the reliability of identifying facial features, in addition to identifying pupils. Furthermore, it can be appreciated that an analogous process can also be used to reinforce the confidence of the sound localization results based on the pupil location data.

Figure 9B:
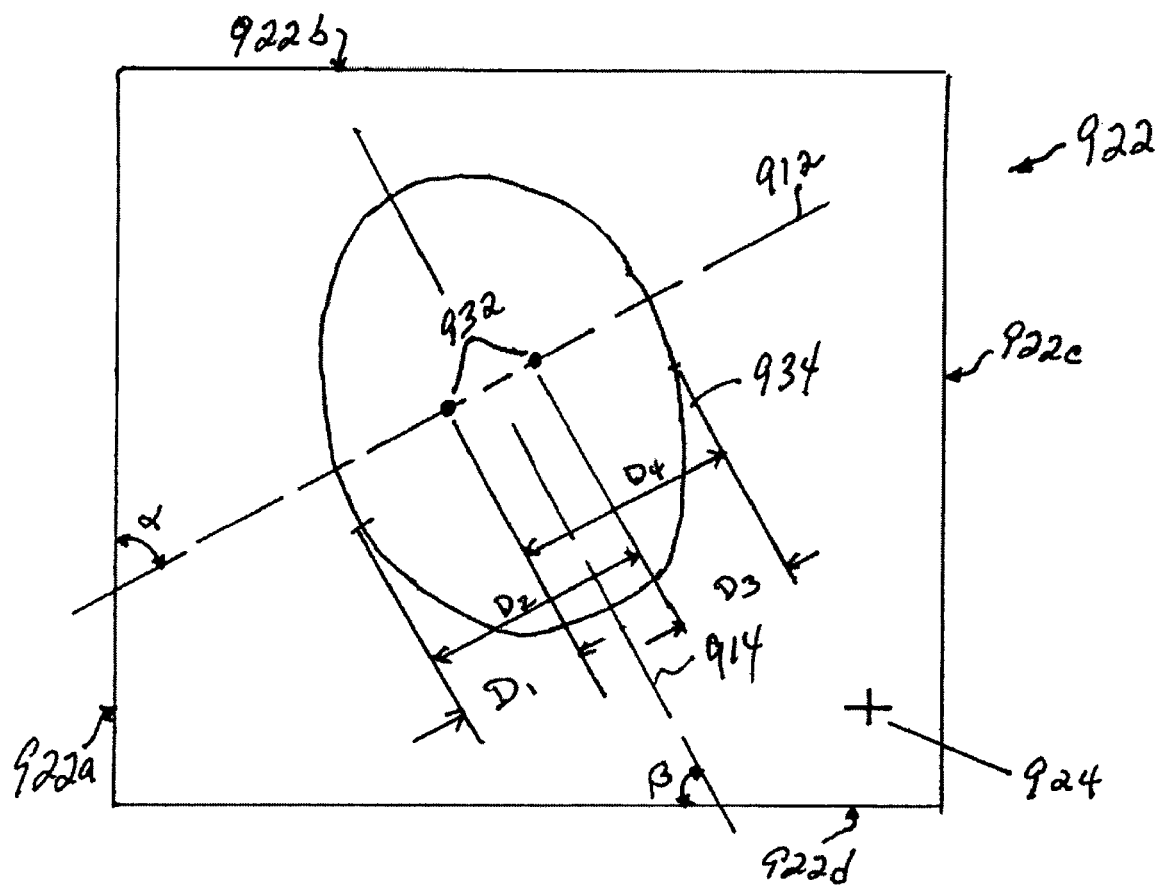

FIG. 9B is a schematic representation of an image 922 taken by a camera, illustrating the metrics in an alternative embodiment for determining best shot. Here, pupil location/orientation and facial orientation can be used to make the determination. The pupils can be identified in an image in the various manners discussed above. In addition, a head outline 934 is also identified from the image. After the pupils are detected, their location/orientation can be determined. In this embodiment, pupil orientation is made relative to a frame of reference R; for example, the edge of the image. Pupil orientation can be defined as an angle α of a pupil line 912 passing through the identified pupils 932 relative to an edge (e.g., 922a) of the image, although any edge can be used, or any other constant point of reference such an alignment mark 924 that can be superimposed on every image at a constant location. Pupil location D can be based on the location of the pupil(s) 932 relative to the detected outline of the head 934. The orientation of the face (head) can be based on a line of symmetry 914 vertically bisecting the detected outline of the face relative to a reference; e.g. the edge of the image. Here, orientation is shown as an angular measurement P. It can be appreciated that the orientation can be defined by other similar metrics.

Pupil location metrics can be used to indicate the degree to which a person is facing directly at the camera and thus serve as a basis for determining the best shot. In an image of a person squarely facing the camera, the pupils 932 will be generally symmetric with respect to the face outline 934. For example, metrics such as pupil distances from the left and right side of the face outline typically will be symmetric. Thus, for example, the $D_1$ and $D_3$ measurements should be close, and the $D_2$ and $D_4$ measurements should be close. It can be appreciated that other such symmetry measurements can be used. When the head is turned, these measurements would no longer be symmetric due to the effect of projecting a three dimensional object onto a two dimensional surface.

Pupil and face (head) orientation can then be used in conjunction with pupil location to further facilitate determining best shot selection in the following manner. These metrics can indicate the degree of rotation of the head. For example, a person who has fallen asleep is not likely to be facing the camera directly, but rather will be facing the table. Thus, for the metrics shown in FIG. 9B, the vertical bisector 914 will have a β of about 90°, as will the pupil line 912. Thus, each candidate image of a person being considered for best shot selection will be analyzed to determine the value of these metrics. The candidate image having the most symmetry in terms of pupil location and having α and β angles that show the least total deviation from 90° will be selected as the best shot image for that person.

Figure 10:
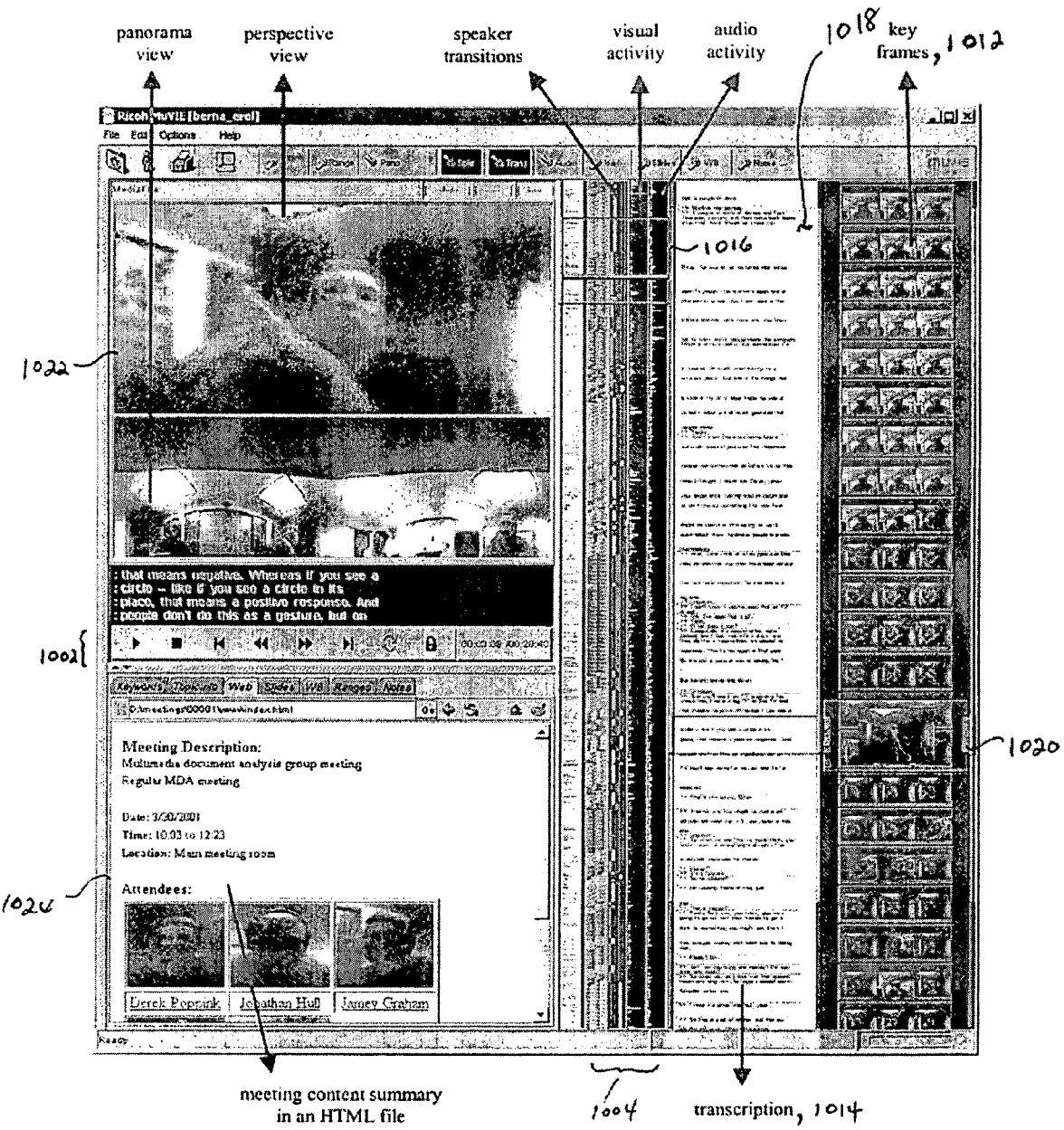
FIG. 10 shows an illustrative embodiment of a graphical user interface (GUI) in accordance with the invention.

FIG. 10 shows an illustrative example of a user interface in accordance with the invention. Meeting recording segments and computed scores can be presented to the user via a suitable GUI as shown in the figure. In this particular embodiment, the GUI is a Java application that supports video editing, and video playback control via control buttons 1002. In a particular embodiment of the invention, enhancements are provided to an interface that is more fully disclosed in U.S. patent application Ser. No. 10/081,129 and in U.S. patent application Ser. No. 10/174,522. The interface is a GUI referred to as the Muvie Client.

The Muvie Client can be enhanced with additional navigational tools based on key frames 1012 and the transcript 1014. A slider window graphic 1016 can be provided which allows the user to scan up and down scales representing speaker transition activity, visual activity, and audio activity. As the slider is manipulated, a transcript window 1018 containing a transcription of the relevant conversation is displayed. A second slider window 1020 can be provided to allow the user to select from among the key frames.

Capability can also be provided for viewing slides, whiteboard images, meeting notes, both the perspective and panoramic meeting video, and audio tracks for speaker location, as well as visual significance measures and audio significance measures. A timeline 1004 is a vertically oriented graphic along which different channels of information can be displayed. The example shown in the figure shows the transcript, video key frames, and the results of speaker transition analysis, video activity analysis as well as audio activity analysis. In general, the Muvie Client enhanced in accordance with this aspect of the present invention, provides a tool for displaying the results of media analysis of the meeting recording. For example, analytical techniques for video such as those embodied in accordance with the invention, and including similar conventional techniques can be visually represented by the Muvie Client. Similarly, analytical techniques according to the present invention for audio and similar conventional techniques can be visualized by the Muvie Client in accordance with this aspect of the invention. Likewise for textual significance scores.

Figure 11:
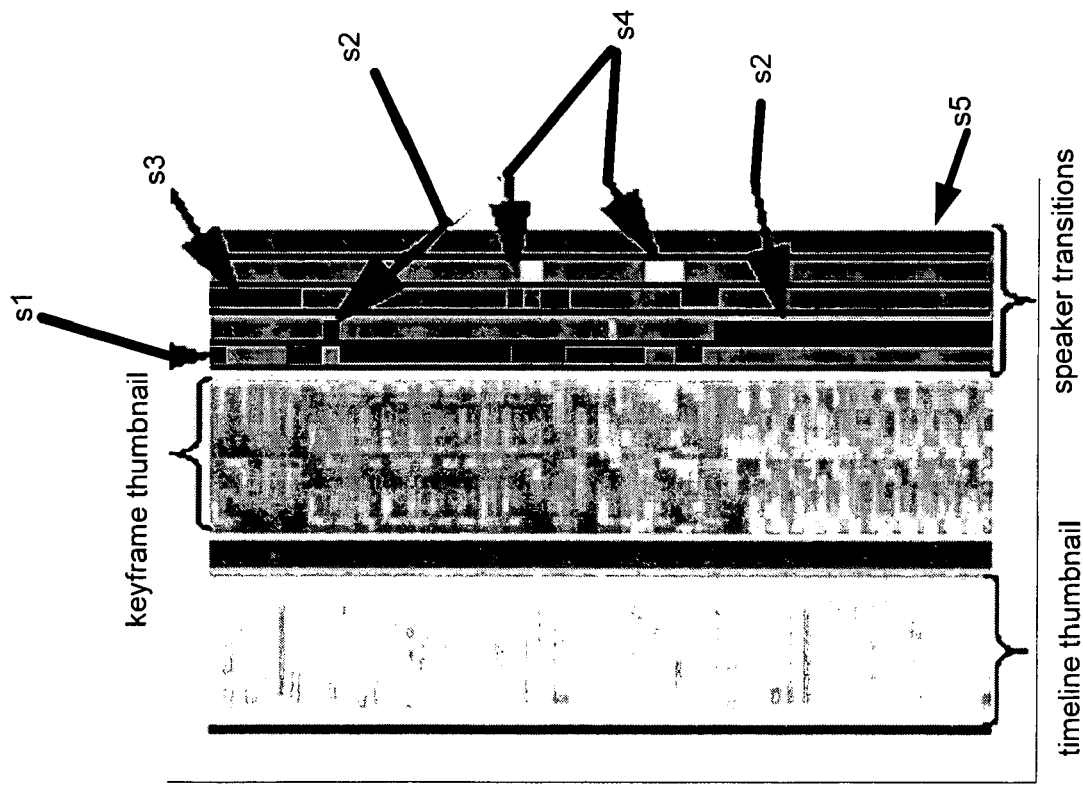
FIG. 11 shows an enlarged view of a portion of the timeline shown in FIG. 10, illustrating speaker transitions along the timeline.

A visual representation of the speaker transitions channel is shown in 1004 in which each speaker can be marked with a unique color (identified in FIG. 11, for example, as s1-s4). This gives the user an indication of "who spoke and when", at a quick glance. We can determine who is speaking from the sound localization data. This information can be enhanced with meeting participant tracking to improve the accuracy of speaker identification as each participant moves about in the meeting area. The output of this process can be provided to the Muvie Client in the following XML format:

```
<MUVIE-SPEAKER>
    <SECTION>
        <TIME>0000</TIME>
        <LOCATIONS>
            <SPEAKER>
                <LOC>1</LOC>
                <VALUE>1</VALUE>
                <ID>255</ID>
            </SPEAKER>
            <SPEAKER>
                <LOC>2</LOC>
                <VALUE>0</VALUE>
                <ID>0xD100FE </ID>
            </SPEAKER>
            ...
        </LOCATIONS>
    </SECTION>
    <SECTION>
        ...
    </SECTION>
    ...
</MUVIE-SPEAKER>
```

A SECTION tag typically marks a period of time (e.g., a one second period). For each SECTION we can have more than one SPEAKER. Each SPEAKER contains the values shown. All the data for a SECTION are shown at the specified TIME on the time line. The LOC tag determines the position of the speaker marking on the display; typically "1" is the leftmost location in the display bar. VALUE can be "0" or "1" indicating whether the person is speaking or not. Alternatively, VALUE can be a real number indicative of the strength of the measure of activity. The ID tag represents a particular speaker and can be used to indicate a color value associated with that speaker. However, we typically assign colors to speakers automatically since this gives the user some control over the visualization.

The Muvie client parses the XML format described above and creates a speaker data structure that can be used to create the display shown in FIG. 10. The speaker data structure contains a linked list of <SECTION> objects. Each <SECTION> object contains a <TIME> and a linked list of <SPEAKER> objects. Each <SPEAKER> object contains a <LOC> (location), a <VALUE> and an <ID>. As noted above, the <VALUE> can either be binary ("0" or "1") or a real number indicating "strength" approximation, if a more accurate representation is desired. In the XML fragment shown, values are in binary format. When the XML file is parsed, it is determined how many <SPEAKER> locations to allocate for this video.

FIG. 11 is an enlarged portion of the timeline 1004, showing a graphical representation of a speaker transition channel positioned next to a text thumbnail and keyframe thumbnail graphic. The speaker transition channel graphic is vertically arranged. The speaker transition channel shows 4 subchannels s1-s4, each representing one speaker location in the meeting. A fifth subchannel s5 is shown, but no activity is indicated, suggesting that the speaker has not spoken during the segment of the timeline shown in FIG. 11. Using the speaker data structure, the speaker transitions can be mapped into appropriate grid locations. For instance, it can be seen that the s1 speaker starts the meeting followed by the s3 speaker. To map the data on the user interface, we convert the time associated with the <SECTION> object into a pixel location using the following parameters:

height=height of current timeline (in pixels)
duration=duration (in seconds) of current video
tpix_m=height/duration (multiplier used to convert seconds into pixels on the timeline)
tsec_m=duration/height (multiplier used to convert pixels into seconds)

For example, suppose we have:
height=786 pixels,
duration=1800 seconds (½ hour)
tpix_m=0.4367 (pixel per second) and
tsec_m=2.29 (seconds per pixel)

Figure 12:
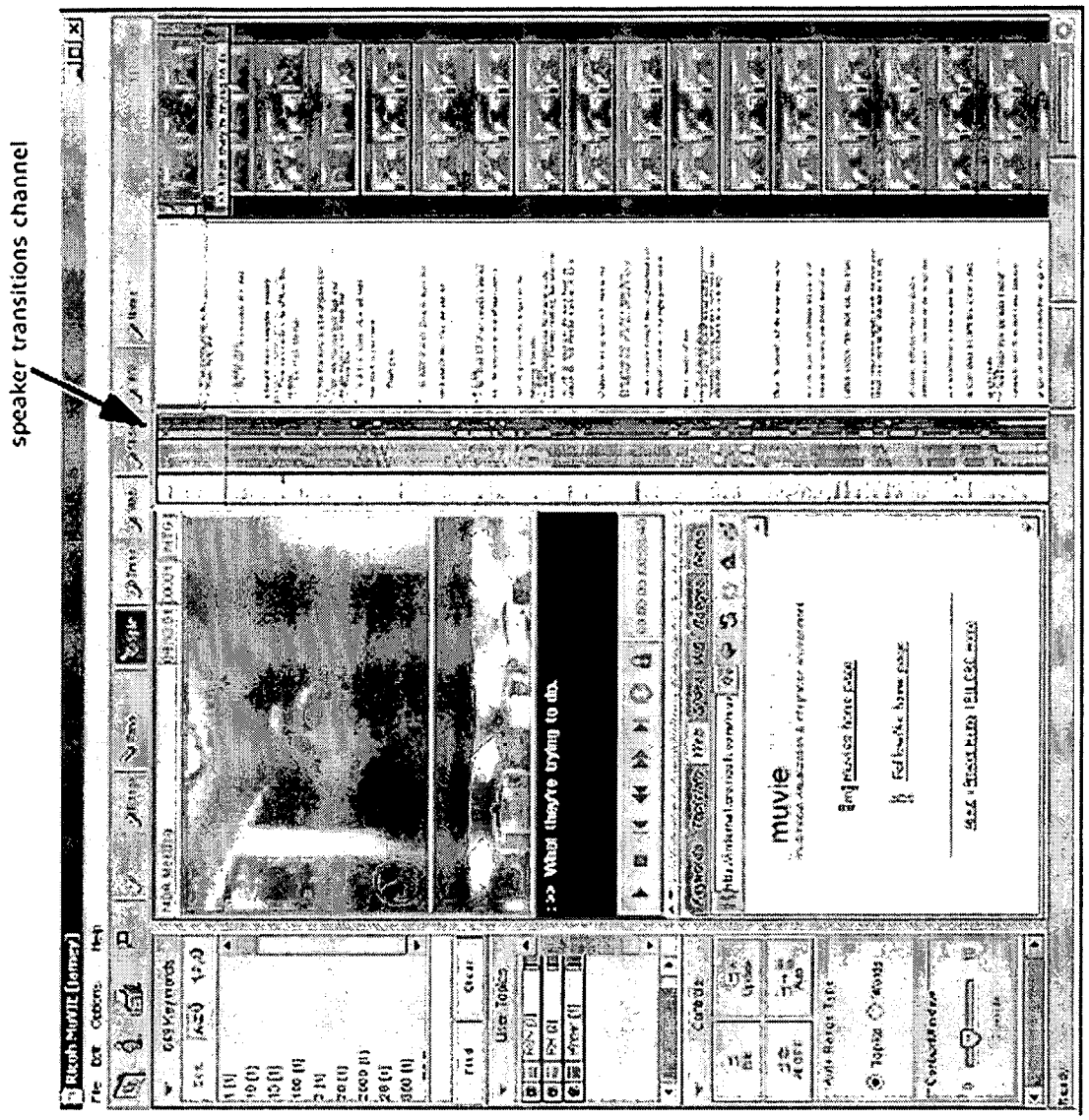
FIG. 12 shows a version of the GUI of FIG. 10, highlighting the speaker transition channels.

Then, when we have a <SECTION> object with a <TIME> stamp of say 356 seconds, we can plot the associated <SPEAKER> structures at location (<TIME>*tpix_m) or 356*0.4367=155 pixels vertically relative to a reference location. FIG. 12 shows a result of iterating through all of the <SECTION> objects and plotting all of the <SPEAKER> data. In this case, each vertical subchannel in the speaker content channel can be assigned a unique color to distinguish it from the other subchannels.

A slider graphic 1016 (FIG. 10) can be manipulated along the timeline 1004 to specify a time index. The location of the slider graphic can be mapped to one or more time indices as shown above. Using the time index(ices), a corresponding video skim can be produced in the manner discussed above and presented in a presentation window 1022.

A representation for the visual activity channel can be graphically represented as a histogram along the time line 1004. It displays the visual activity scores for each unit of time (e.g., seconds, minutes) of a video sequence. The score is computed per Eqn. 2 and can be normalized for the display area. A slider window 1020 can be used to navigate the video based on the visual activity scores. The video and the rest of the metadata are automatically synchronized during the playback. The output of visual activity analysis is given to the Muvie Client in the following XML format:

```
<MUVIE-SECTIONS>
    <SECTION>
        <STIME>0</STIME>
        <ETIME>0</ETIME>
        <VALUE>20</VALUE>
    </SECTION>
    <SECTION>
        <STIME>1</STIME>
        <ETIME>1</ETIME>
        <VALUE>11</VALUE>
    </SECTION>
    <SECTION>
    . . .
</MUVIE-SECTIONS>
```

The SECTION tag typically marks a one second period. However, it can be extended to longer periods of time. The STIME tag determines the start time and the ETIME tag determines the end time when a particular activity score is valid.

The Muvie client parses the XML format described above and creates a data structure that can be used to create a representation for visual activity analysis shown in FIG. 10. The XML file contains a collection of <SECTION> objects where each <SECTION> contains a <STIME> (start time), <ETIME> (end time), and a <VALUE>. The <STIME> and <ETIME> values are represented in seconds but could also be represented in milliseconds. At present we use the same start and stop time, but one could easily modify this to show <SECTION> tags which depicted time ranges, e.g. 4 second time periods. The VALUE represents the visual activity taking place at a given time during a video.

Figure 13:
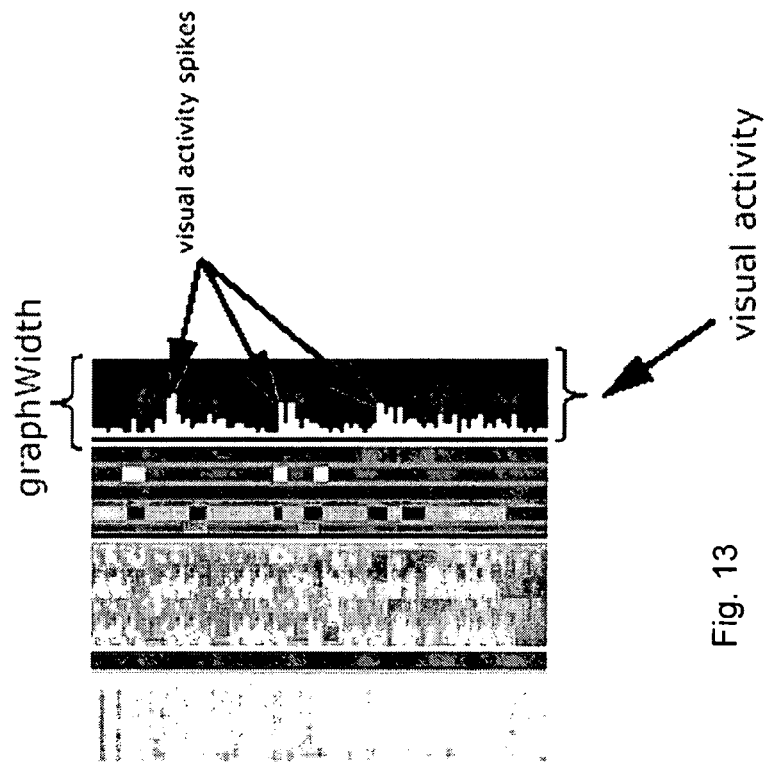
FIG. 13 shows an enlarged view of a portion of the timeline shown in FIG. 10, illustrating visual activity metrics along the timeline.

To plot this information on a user interface, as we did with the speaker transition information, a video channel is included in the timeline 1004 where we plot the visual activity as shown in FIG. 13. The histogram shown in FIG. 13 is plotted with the X-axis oriented vertically and the Y-axis oriented horizontally such that histogram bars with higher Y values represent more activity than those with lower Y values. Each <SECTION> tag contains a start and stop time. As noted above, we are using the same start and stop time, but one could easily modify this to show <SECTION> tags which depicted time ranges, e.g. 4 second time periods.

To map the data onto the user interface, we first determine the highest value represented in the data collection. We call this value max. Next we determine the width of the user interface which we call graphWidth (see FIG. 13). This value is predetermined by a default setting or by user configuration. We use the combination of the max value and the graphWidth to plot the values on the Y-axis. We use the tpix_m to plot the values along the X-axis since these values are based on time.

For example, if we have a <SECTION> object with a <TIME> value of 491 and a <VALUE> of 56, where graphWidth=50 and max=78, then, we have a new multiplier graph m=max/graphWidth or 1.56. We divide the <VALUE> by graph m to produce the width of the histogram bar for this <SECTION> object. Therefore, in the above example, we would plot the <SECTION> with <TIME>=491 and <VALUE>=56 at the vertical location (time) 491*.4367=214 with a width of 56/1.56=35. This process is conducted on each <SECTION> object to produce a timeline channel similar to the one shown in FIG. 14.

A representation for the audio activity channel is shown in 1004 that displays the audio activity scores for each minute (can be in seconds) of a video sequence. This value is computed according to Eqn. 4 and scaled for the display area. It is displayed, navigated, and formatted in the same way as the visual activity data described above.

Completing the description of to FIG. 10, the presentation window 1022 can be utilized to display additional modalities such as captured slide images, captured whiteboard images, and captured meeting notes. As shown in the figure, the presentation window can display perspective and panoramic views of the meeting recording. The foregoing techniques for obtaining meeting location and meeting participants can be incorporated in a meeting summary window 1024. Best shot selection can be used to provide the best image available of each participant.

Using this interface, the user can browse a meeting by reading the description page, listening only to the speakers that he is interested in, looking at the high-motion parts, searching for keywords in the transcription, looking at the presentation slides and whiteboard images, and so on. In this way, hours of meetings can be browsed in much less time. The user interface can also support editing of the video, which enables the user to efficiently communicate meeting documents with others.

Figure 15:
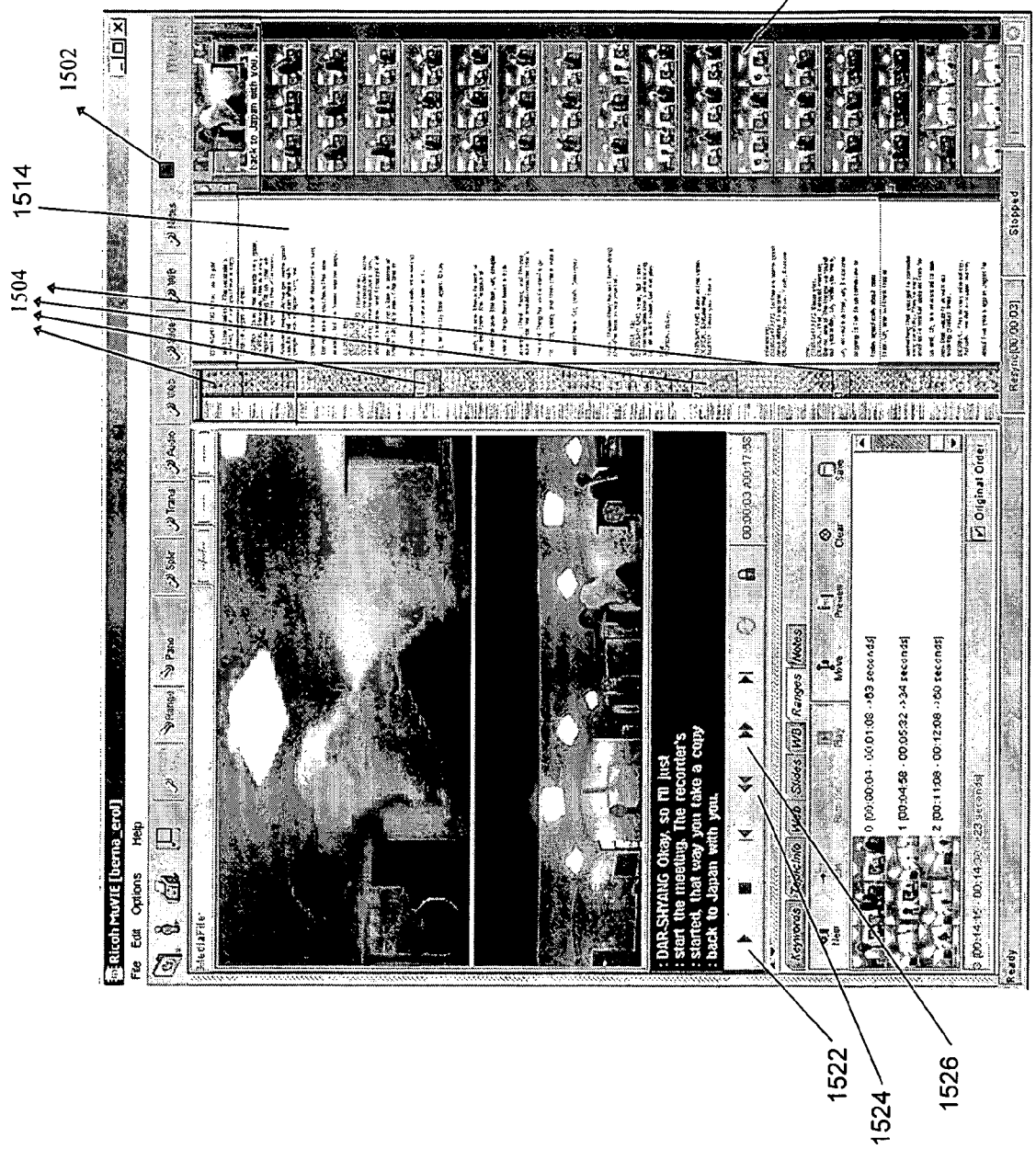
FIG. 15 illustrates a example of a meeting summary display.

FIG. 15 shows an implementation of another aspect of the present invention in which summaries can be represented. A summary create check box 1502, or other such graphic, can be presented to a user. The summary create check box when activated (by "clicking" on it, for example) can determine summary segments from the meeting recording and provide a visual representation. In the example shown in FIG. 15, summary windows 1504 highlight those portions of the timeline which correspond to the identified summary segments.

The meeting summaries can be generated based on individual or combinations of visual scores, audio scores, text importance scores, and importance score computed from slide presentations, whiteboard capture data, and notes in the manner discussed above. The user can specify which modalities to use when generating the summary. Using the time indices corresponding to the scores of the selected modality (ies), summary windows 1504 can be generated and displayed.

For example, the user can specify a one-minute long meeting summary based on audio and visual activity importance. Thus, the N highest visual scores and the M highest audio scores can be deemed to constitute a summary of the meeting. As discussed above, video skims corresponding to the time indices of these scores can be generated. However, rather than displaying video skims, the range of time indices corresponding to the generated video skims can be used to generate the summary windows 1504 shown in FIG. 15. This allows the user to browse the recorded meeting with the summary windows acting as annotations signifying the significant portions of the event (e.g., a meeting) that was recorded. The highlighted sections thus can serve as a guide for meeting reviews, navigation, editing, sharing, printing, and generally making life easier for the reviewer.

In another example, the user may request a five-minute meeting summary based on slide importance. The slides that the presenter had spent the most time on might be considered important. Thus, the meeting summary might comprise one-minute meeting segments corresponding to five such slides. Again, the range of time indices corresponding to the presentation of those slides would be used to generate summary windows 1504.

As an alternative to displaying summary window graphics 1504, portions of text in the transcription window 1514 corresponding to the time indices can be highlighted. Similarly, corresponding keyframes 1512 can be highlighted. It can be appreciated that other similar forms of indicating the recorded meeting segments comprising the meeting summary are possible.

Selection of a summary window 1504 such as by clicking can cause a corresponding video skim to be played. Similarly, clicking on a highlighted portion of text or a highlighted keyframe can cause the corresponding video skim to be played. Alternatively, all the video skims comprising the meeting summary can be played sequentially by clicking on a "playback" button 1522. Navigation control through a video skim can be provided by "reverse" and "fast forward" buttons 1524, 1526 provided via the interface, allowing the user to watch only the highlighted parts, or skip to other sections of the meeting.

Figure 16:
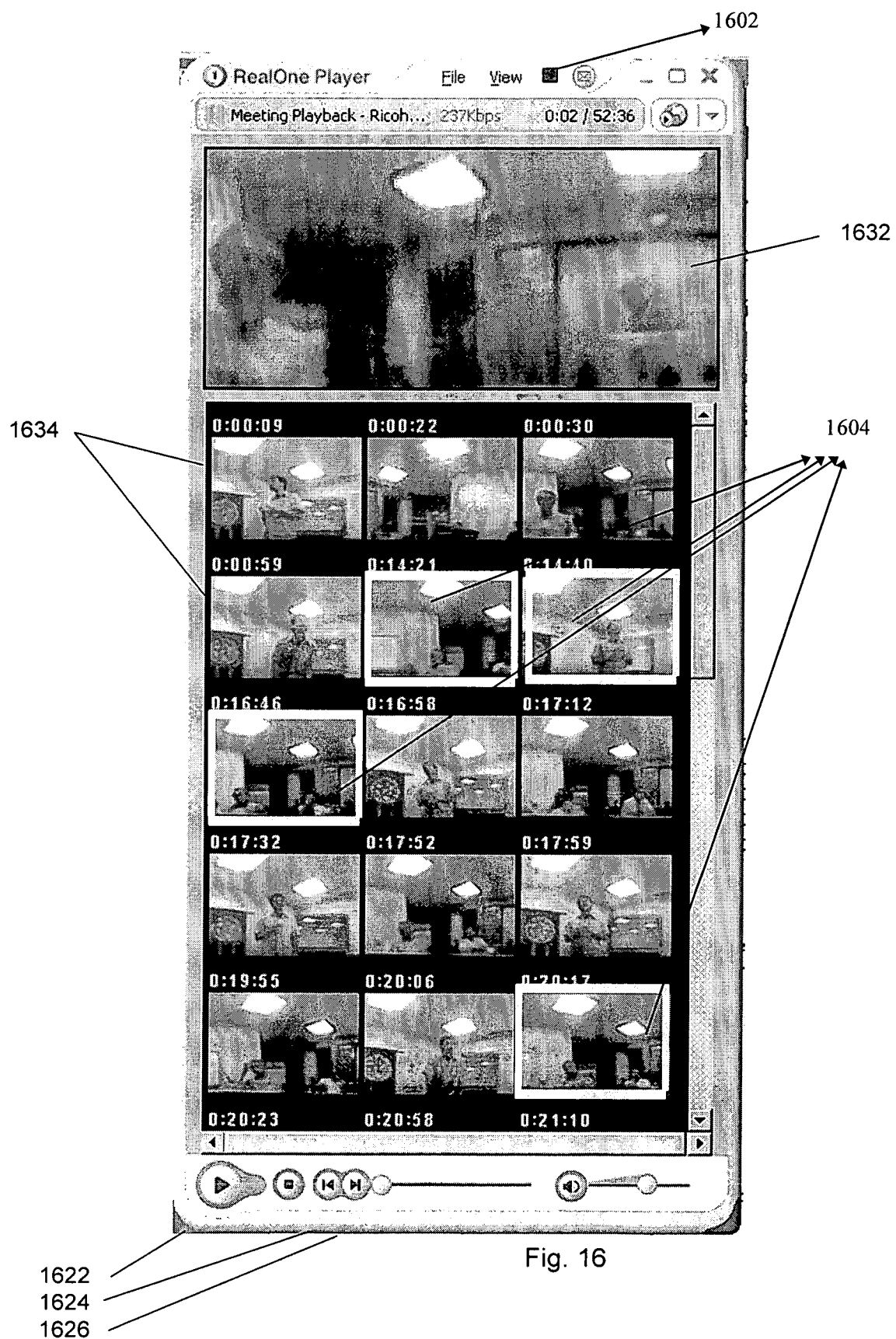
FIG. 16 illustrate a meeting summary display generated using SMIL.

FIG. 16 illustrates another GUI exemplar. Here, a markup language known as SMIL (Synchronized Multimedia Integration Language) is a public domain standard that is well-suited for displaying the variety of media that can be present in a meeting recording. A SMIL-based interface can be driven by the Real player display engine from RealNetworks, Inc. The omni-directional image of a meeting recording can be dewarped as described above and presented to the Real player via a SMIL script and presented in a window 1632 in the Real player. Key frames 1634 extracted from the video can be shown with their corresponding time indices (time stamps) by the Real player. Clicking on a key frame can result in the action of repositioning the video to start a playback sequence starting from the corresponding time index.

The interface shown in FIG. 16 can provide a meeting summary function as described in FIG. 15. A summary create graphic 1602 can serve to initiate computation of a meeting summary. Keyframes 1604 which correspond to the meeting segments deemed to constitute the meeting summary (as determined based on one or more user specified modalities) can be highlighted to indicate the location of the meeting summary segments. Clicking on a highlighted keyframe can reposition the video in the playback window 1632 to the time index corresponding to the "clicked" keyframe. Navigation buttons, such as playback 1622, rewind 1624, and fast-forward 1626, can be provided, in addition to other conventional navigation controls, to facilitate navigating the summary segments.

What is claimed is:

1. A computer-implemented method for retrieving portions of multimedia information comprising:

presenting portions of said multimedia information in a first window graphic, said portions arranged according to a temporal sequence of occurrence in said multimedia information;

producing a plurality of video scores based on video data contained in said multimedia information, said video scores corresponding to portions of said video data;

presenting a second window graphic within which video data can be presented;

presenting a visual representation of said video scores; and detecting a selection of one or more video scores and in response thereto selecting segments of said video data corresponding to said one or more video scores and presenting said segments of said video data in said second window graphic, wherein said video data is representative of doughnut-shaped images, said video score being computed from:

$$V_a = \max\left\{\sum_{n=-L/2}^{L/2} \sum_{m=-L/2}^{L/2} \left(\omega\left(\sqrt{(x+n)^2 + (y+m)^2}\right) A_{x+n,y+m}\right)\right\},$$

$$\forall x = [-W/2 + L/2 \ldots W/2 - L/2],$$

$$\forall y = [-H/2 + L/2 \ldots H/2 - L/2].,$$

where

W and H are a width and a height of said first video frame,

L is a subframe size,

ω(r) is a weight of a unit pixel block at location r (in polar coordinates)

$A_{ij}$ is a luminance difference between two of said unit pixel blocks at location (i×M, j×N) respectively in each of two consecutive frames of video and a pixel area is M×N.

2. The method of claim 1 wherein each of said video scores corresponds to a frame of video, the method further comprising for each video score in said one or more video scores obtaining a video clip based on a video frame corresponding to said each video score to produce said segments of said video data.

3. The method of claim 2 wherein each said video clip includes an associated audio track.

4. The method of claim 1 wherein said multimedia information is a meeting recording.

* * * * *